(12) United States Patent
Mazumder

(10) Patent No.: US 8,559,193 B2
(45) Date of Patent: Oct. 15, 2013

(54) ZERO-VOLTAGE-SWITCHING SCHEME FOR HIGH-FREQUENCY CONVERTER

(75) Inventor: Sudip K. Mazumder, Hoffman Estates, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 399 days.

(21) Appl. No.: 13/011,888

(22) Filed: Jan. 22, 2011

(65) Prior Publication Data

US 2012/0063184 A1    Mar. 15, 2012

Related U.S. Application Data

(60) Provisional application No. 61/297,425, filed on Jan. 22, 2010.

(51) Int. Cl.
*H02M 7/48* (2007.01)
*H02M 5/257* (2006.01)

(52) U.S. Cl.
USPC .................. 363/8; 363/65; 363/132; 363/163

(58) Field of Classification Search
USPC ............ 363/8, 65, 97, 98, 131, 132, 163–165
See application file for complete search history.

(56) References Cited

U.S. PATENT DOCUMENTS

| | | | |
|---|---|---|---|
| 4,479,175 A * | 10/1984 | Gille et al. ...................... | 363/41 |
| 5,122,728 A | 6/1992 | Ashley | |
| 5,189,603 A * | 2/1993 | Sashida et al. ................ | 363/160 |
| 5,204,809 A | 4/1993 | Andresen | |
| 5,285,365 A | 2/1994 | Yamato et al. | |
| 5,598,326 A | 1/1997 | Liu et al. | |
| 5,856,712 A | 1/1999 | Suzuki et al. | |
| 6,005,788 A | 12/1999 | Lipo et al. | |
| 6,330,170 B1 | 12/2001 | Wang et al. | |
| 6,437,999 B1 | 8/2002 | Wittenbreder | |

(Continued)

FOREIGN PATENT DOCUMENTS

WO    WO-2007/050577    5/2007

OTHER PUBLICATIONS

Acharya, K., et al., 2003, "System-interaction analyses of solid-oxide fuel cell (SOFC) power-conditioning system", IEEE Industrial Application Society Conference, pp. 2026-2032.

(Continued)

*Primary Examiner* — Adolf Berhane
*Assistant Examiner* — Fred E Finch, III
(74) *Attorney, Agent, or Firm* — Greer, Burns & Crain Ltd.

(57) ABSTRACT

Method for operating an ac/ac converter circuit for a high-frequency-link converter. The ac/ac converter circuit converts an ac input voltage to an ac output voltage. When the ac input voltage is zero, each of a pair of switches for both first and second arms are caused to be on. Current flows through the first arm along a first direction and through the second arm along a second, opposite direction. Next, when the ac input voltage is zero, a selected switch in the second arm is caused to be turned off. The position of the switches can be maintained as the ac input voltage transitions to a dc level, reaches the dc level, approaches zero, and again reaches zero. When the ac input voltage again reaches zero, the selected switch for the second arm is caused to be turned on.

23 Claims, 20 Drawing Sheets

(56) References Cited

U.S. PATENT DOCUMENTS

| | | | |
|---|---|---|---|
| 7,372,709 B2 | 5/2008 | Mazumder et al. | |
| 7,808,129 B2 | 10/2010 | Mazumder et al. | |
| 2003/0133317 A1* | 7/2003 | Norrga | 363/127 |
| 2004/0125618 A1 | 7/2004 | De Rooij et al. | |
| 2008/0055938 A1* | 3/2008 | Kajouke et al. | 363/13 |
| 2009/0225569 A1* | 9/2009 | Begalke | 363/17 |
| 2009/0283664 A1 | 11/2009 | Mazumder et al. | |
| 2010/0284208 A1* | 11/2010 | Nguyen et al. | 363/160 |
| 2011/0181128 A1* | 7/2011 | Perreault et al. | 307/151 |

OTHER PUBLICATIONS

Andersen, G.K., et al., 2002, "A New Green Power Inverter for Fuel Cells", IEEE Power Electronics Specialists Conference, pp. 727-733.

Blaabjerg, F., et al., "Power Losses in PWM-VSI Inverter Using NPT or PT IGBT Devices." IEEE Trans. Power Electronics, vol. 10 (3), pp. 358-367 (May 1995).

Bohn, T.P., et al., 2003, "A Low-Cost Inverter for Domestic Fuel Cell Applications", Fuel Cell Seminar. http://www.energychallenge.org/FuelCellSeminar.pdf.

Burra, R.K., et al., "A low-cost fuel-cell (FC) power electronic system (PES) for residential loads", IEEE International Telecommunications energy conference, 2004, pp. 468-478.

Cha, H., et al., "A New Soft Switching Direct Converter for Residential Fuel Cell Power System", IEEE IAS Annual Meeting, pp. 1172-1177 (2004).

Cho, J., et al., "Zero-Voltage and Zero-Current-Switching Full-Bridge PWM Converter Using Secondary Active Clamp", IEEE Trans. Power Electronics, vol. 13 (4), pp. 601-607 (Jul. 1998).

Deng, S., et al., "A new control scheme for high-frequency link inverter design", IEEE Applied Power Electronics Conference and Exposition, pp. 512-517. 2003.

Enjeti, P.N., et al., 1991, "A new dc-side active filter for inverter power supplies compensates for unbalanced and nonlinear loads", IEEE Industry Applications Society Conference, pp. 1023-1031.

Ertl, H., et al., "A Novel Multicell DC-AC Converter for Applications in Renewable Energy Systems", IEEE Transactions on Industrial Electronics, pp. 1048-1057, Oct. 2002.

Espelage, P., et al., "High-Frequency Link Power Conversion", IEEE Trans. Industry Applications, vol. 1A-13 (5), pp. 387-394 (Sep./Oct. 1977).

Friedrichs, P., et al., "SiC Power Devices with Low On-Resistance for Fast Switching Applications", The 12th International Symposium on Power Semiconductor Devices and ICs, pp. 213-216 (2000).

Fujimoto, H., et al., "Photovoltaic Inverter with a Navel Cycloconverter for Interconnection to a Utility Line", IEEE IAS Annual Meeting, pp. 2461-2467 (1995).

Gemmen, Randall S., Ph.d "Analysis For The Effect of Inverter Ripple Current on Fuel Cell Operating Condition", NETL/DOE, Morgantown WV. www.nfcrc.uci.edu/UFFC/PowerElectronics/PDFs/24_20Gemmen.pdf.

Ghodke, D., et al., "Three-Phase Three Level, Soft Switched, Phase Shifted PRM DC-DC Converter for High Power Applications", IEEE Trans. Power Electronics, vol. 23 (3), pp. 1214-1227 (May 2008).

Gopinath, R., et al., 2002, "Development of a Low Cost Fuel Cell Inverter with DSP Control", IEEE Power Electronics Specialists Conference, pp. 309-314.

Haynes, C., et al., "Characterizing heat transfer within a commercial-grade tubular solid oxide fuel cell for enhanced thermal management", International Journal of Hydrogen Energy 26 (2001) 369-379.

Houldsworth, J., et al., "The Use of Harmonic Distortion to Increase the Output Voltage of a Three-Phase PWM Inverter", IEEE Trans. Industry Applications, IA-20 (5), pp. 1224-1228 (1984).

Huang, R., et al., "A Novel Soft-Switching Scheme for an Isolated Dc/Dc Converter with Pulsating Dc Output for a Three-Phase High-Frequency-Link PWM Converter", IEEE Conference, pp. 1-9 (2008).

Inoue, S., et al., "A Bidirectional DC/DC Converter for an Energy Storage System with Galvanic Isolation", IEEE Trans. Power Electronics, vol. 22 (6), pp. 2299-2306 (Nov. 2007).

Kawabata, T., et al., "High Frequency Link DC/AC Converter with PWM Cycloconverter", IEEE IAS Annual Meeting, pp. 1119-1124 (1990).

Kolar, J., et al., "Influence of the Modulation Method on the Conduction and Switching Losses of a PWM Converter System", IEEE Trans. Industry Applications, pp. 1063-1075 (Nov./Dec. 1991).

Krein, P.T., et al., 2002, "Low Cost Inverter Suitable for Medium-Power Fuel Cell Sources", IEEE Power Electronics Specialists Conference, pp. 321-326.

Lai, Dr. Jason, "A High-Efficiency Low-Cost DC-DC Converter for SOFC", http://www.netl.doe.gov/publications/proceedings/03/seca20core/Jason20Lai20VT.pdf.

Liu, C., et al., "A Novel Three-Phase High-Power Soft-Switched DC/DC Converter for Low-Voltage Fuel Cell Applications", IEEE Trans. Industry Applications, vol. 41 (6), pp. 1691-1697 (Nov./Dec. 2005).

Matsui, M., et al., "High-Frequency Link DC/AC Converter with Suppressed Voltage Clamp Circuits—Naturally Commutated Phase Angle Control with Self Turn-Off Devices", IEEE Trans. Industry Applications, vol. 32 (2), pp. 293-300 (1996).

Mazumder, S., "A Novel Zero-voltage-Switching Scheme for Photovoltaic-/Fuel-Cell-Based High-Frequency-AC-Link Inverter".

Mazumder, S., "A Novel Zero-voltage-Switching Scheme for Renewable/Alternative Energy Based High-Frequency-AC-Link Inverter", IEEE 2009, pp. 2218-2223.

Mazumder, S.K., et al., "Primary-Side-Converter-Assisted Soft-Switching Scheme for an Ac/Ac Converter in a cycloconverter-Type High-Frequency-Link Inverter", IEEE 2010.

Mazumder, S., et al., "Multiple Lyapunov Function Based Reaching Condition Analyses of Switching Power Converters", IEEE Power Electronics Specialists Conference, pp. 2232-2239 (Jun. 2006).

Mazumder, S., et al., "A High-power High-frequency and Scalable Multi-megawatt Fuel-cell Inverter for Power Quality and Distributed Generation" International Conference on Power Electronics, Drives and Energy Systems, pp. 1-5 (Dec. 12-15, 2006).

Mazumder, S., et al., "Effects of Battery Buffering on the Post-Load-Transient Performance of a PSOFC", IEEE Trans. Energy Conversion, vol. 22 (2), pp. 457-466 (2007).

Mazumder, S., "A Novel Hybrid Modulation Scheme for an Isolated High-Frequency-Link Fuel Cell Inverter", Invited NSF Panel Paper, Proc. of IEEE Power Engineering Society Conference, Pittsburgh, (Jul. 2008).

Mazumder, S.K., et al., "Fuel Cell Power Conditioner for Stationary Power System: Towards Optimal Design from Reliability, Efficiency, and Cost Standpoint" Keynote Lecture on Fuel cell power electronics system, ASME Third International Conference on Fuel Cell Science, Engineering and Technology, Yipsilanti, Michigan, FUELCELL2005-74178, May 23-25, 2005.

Mazumdar, J., et al., 2002, "High Frequency Low Cost DC-AC Inverter Design with Fuel Cell Source for Home Applications", IEEE Industry Applications Conference, pp. 789-794.

Novaes, Y.R., et al., 2003, "Low Frequency Ripple Current Elimination in Fuel Cell Systems", Fuel Cell Seminar, (available at http://www.energychallenge.org/FuelCellSeminar.pdf).

Peng, F.Z., 1998, "Application issues of active power filters", IEEE Industry Applications Magazine, pp. 21-30.

Perruchoud, P., et al,, "Power Losses for Space Vector Modulation Techniques", IEEE Power Electronics in Transportation, pp. 167-173 (1996).

Pyke, S.H., et al., "Systems development for planar SOFC based power plant", ETSU F/01/00195/REP, DTI/Pub UNR 02/868, Contractor: ALSTOM Research and Technology Centre.

Rocabert, J., et al., "A Regenerative Active Clamp Circuit for DC/AC Converters with High-Frequency Isolation in Photovoltaic Systems", IEEE PESC, pp. 2082-2088 (2004).

Sabate, J., et al., "High-Voltage, High-Power, ZVS, Full-Bridge PWM Converter Employing an Active Snubber", IEEE APEC, pp. 158-163 (1991).

Saito, M., et al., 2003, "Modeling and control strategy for a single-phase PWM rectifier using a single-phase instantaneous active/reactive power theory", IEEE International Telecommunications Energy Conference, pp. 573-578.

(56) References Cited

OTHER PUBLICATIONS

9. Sample Calculations http://www.materialsworld.net/PASI/reading/Pages_369_to_451_from_FCHandbook6.pdf.

Shirnzu, T., et al., 1997, "A unity power factor PWM rectifier with DC ripple compensation", IEEE Transactions on Industrial Electronics, pp. 447-455.

Toh, L., et al., "High-Frequency Transformer-Link Inverter with Regenerative Snubber", IEEE PEDS, pp. 642-647 (2006).

Trzynadlowski, A., et al., "Minimum-Loss Vector PWM Strategy for Three-Phase Inverters", IEEE Trans. Power Electronics, vol. 9 (1), pp. 26-34 (1994).

Tuckey, A.M. et al., 2002, "A Low-Cost Inverter for Domestic Fuel Cell Applications", IEEE Power Electronics Specialists Conference, pp. 339-346.

Van der Broeck, H., "Analysis of the Harmonics in Voltage Fed Inverter Drives Caused by PWM Schemes with Discontinuous Switching Operation", Proc. EPE, pp. 3-261-3-266 (1991).

Wang, G., et al., 2003, "High Efficiency Low Cost Inverter System for Fuel Cell Application", Fuel Cell Seminar, 2003, p. 20.

Wang, J., et al., 2003, "A New Low Cost Inverter System for 5 kW Fuel Cell", Fuel Cell Seminar. http://www.energychallenge.org/FuelCellSeminar.pdf.

Wang, K., et al., "A New Soft-Switched Quasi-Single-Stage (QSS) Bi-Directional Inverter/Charger", IEEE IAS Annual Meeting, pp. 2031-2038 (1999).

Watson, R. et al., "A Soft-Switched, Full-Bridge Boost Converter Employing an Active-Clamp Circuit", IEEE PESC, pp. 1948-1954 (1996).

Castilla, M., et al., "A comparative study of sliding-mode control schemes for quantum series resonant inverters", IEEE Transactions on Industrial Electronics, vol. 56, No. 9, pp. 3487-3495, 2009.

Fukuda, S., et al., "A novel current-tracking method for active filters based on a sinusoidal internal model", IEEE Transactions on Industry Applications, vol. 37, No. 3, pp. 888-895, 2001.

Garcia-Gil, R., et al., "A bidirectional and isolated three-phase rectifier with soft-switching operation", IEEE Transactions on Industrial Electronics, vol. 52, No. 3, pp. 765-773, 2005.

Gopinath, R., et al., "Development of a low cost fuel cell inverter system with DSP control", IEEE Transactions on Power Electronics, vol. 19, No. 5, pp. 1256-1262, 2004.

Jung, S., et al., "A low cost utility interactive inverter for residential fuel cell generation", IEEE Transactions on Power Electronics, vol. 22, No. 6, pp. 2293-2298, 2007.

Kjaer, S.B., et al., "A review of single-phase grid-connected inverters for photovoltaic modules," in IEEE Transactions on Industry Applications, vol. 41, No. 5,2005. "Renewable energy cost trends", available online at www.nrel.gov/analysis/docslcostJurves_2005.ppt.

Koutroulis, E., et al., "Bidirectional, sinusoidal, high-frequency inverter design", IEE Proceedings Electric Power Applications, pp. 315-321, 2001.

Krein, P.T., et al., "High-frequency link inverter for fuel cells based on multiple-carrier PWM", IEEE Transactions on Power Electronics, vol. 19, No. 5, pp. 1279-1288.

Manias, S., et al., "Bilateral dc to ac converter employing a high frequency link", IEEE Industry Applications Society Conference, pp. 1156-1162, 1985.

Mazumder, S.K., et al., "A ripple-mitigating and energy-efficient fuel cell power-conditioning system", IEEE Transactions on Power Electronics, vol. 22, No. 4, pp. 1437-1452, Jul. 2007.

Mazumder, S.K., et al., "A universal grid-connected fuel-cell inverter for residential application", IEEE Transactions on Industrial Electronics, vol. 57, No. 10, pp. 3431-3447, 2010.

Mazumder, S.K., et al., "Single-stage low-cost and energy-efficient isolated phase-shifted high-frequency inverter followed by a forced cycloconverter for universal residential fuel cell power system", IEEE International Conference on Electro/Information Technology, Rhodes, Greece, pp. 408-413, 2008.

Min, B.D., et al., "A new topology with high efficiency throughout all load range for photovoltaic PCS", IEEE Transactions on Industrial Electronics, vol. 56, No. 11, pp. 4427-4435, 2009.

Ramanarayanan, D. De and V., "A dc to three phase ac high frequency link converter with compensation for non-linear distortion", IEEE Transactions on Industrial Electronics, vol. 57, No. 11, pp. 3669-3677.

Silva, S.M., et al., "Performance evaluation of PLL algorithms for single-phase grid-connected systems," in Proc. The 39th IEEE Industry Application Society Conference and Annual Meeting (IAS '04), Seattle, USA, Oct. 2004, pp. 2259-2263.

Tao, H., et al., "A distributed fuel cell based generation and compensation system to improve power quality," in Proc. IEEE International Power Electronics and Motion Control Conference (IPEMC'06), Shanghai, China, Aug. 2006, pp. 1-5.

Tazume, K., et al., "Novel method for controlling a high-frequency link inverter using cycloconverter techniques", IEEE Power Electronics Specialists Conference, pp. 497-502, 1998.

Teodorescu, R., et al., "Flexible control of small wind turbines with grid failure detection operating in stand-alone and grid-connected mode," IEEE Trans. Power Electronics, vol. 19, No. 5, pp. 1323-1332, Sep. 2004.

Tepper, J.S., et al., "A simple frequency-independent method for calculating the reactive and harmonic current in a nonlinear load," IEEE Trans. Industrial Electronics, vol. 43, No. 6, pp. 647-654, Dec. 1996.

Xiao, W., et al., "Analysis and design of an automatic-current-sharing control based on average-current mode for parallel boost converters", Power Electronics and Motion Control Conference, pp. 1-5, 2006.

Yamato, I., et al., "High frequency link dc-ac converter for UPS with a new voltage clam per", IEEE Power Electronics Specialists Conference, pp. 749-756, 1990.

Yamato, I., et al., "Power loss reduction techniques for three phase high frequency link dc-ac converter", IEEE Power Electronics Specialists Conference, pp. 663-668, 1993.

Zansky, Z., "Phase-modulated ac supply exhibits high efficiency", EON, pp. 177-180, 1985.

Zmood, D.N., et al., "Stationary frame current regulation of PWM inverters with zero steady-state error", IEEE Transactions on Power Electronics, vol. 18, No. 3, pp. 814-822, 2003.

\* cited by examiner

ZERO-VOLTAGE-SWITCHING SCHEME FOR HIGH-FREQUENCY CONVERTER

PRIORITY CLAIM AND REFERENCE TO RELATED APPLICATION

This application claims the benefit of U.S. Provisional Application Ser. No. 61/297,425, filed Jan. 22, 2010, under 35 U.S.C. §119.

STATEMENT OF GOVERNMENT INTEREST

This invention was made with government support under National Science Foundation Grant No. 0725887. The government has certain rights in the invention.

FIELD OF THE INVENTION

A field of the invention is power converters.

BACKGROUND OF THE INVENTION

The need for energy security and energy surety is slowly driving worldwide end-energy users towards renewable and alternative sources of energy. The impact of this movement appears to have a correlation with progressively reduced cost of the energy sources. A further need is to reduce the cost of the interfacing power-electronics system (PES), which is relatively difficult since power electronics is already a relatively mature field.

As a nonlimiting example, high efficiency, low cost, and high power density are important attributes of a multi-phase converter (i.e., converter with one or more phases) fed with a dc source. Nonlimiting example applications include distributed generation (DG) systems with renewable and alternative energy sources (e.g., photovoltaic arrays, wind with front-end rectifier or fuel-cell stacks), energy storage systems, microgrid, vehicle-to-grid applications, electric/hybrid-electric/fuel-cell vehicles, compact power conversion modules (PCMs) for naval, space, and aerospace applications, and battery-based uninterruptible power supplies (UPSs). In such systems, galvanic isolation is often required for safety concerns and voltage and current scalabilities.

In that regard, an improvement in the art has resulted in a shift away from line-frequency-transformer-based bulky inverters towards high-frequency-transformer-based inverters, which saves weight, volume, footprint space, and labor cost. This first phase has resulted in about 20-kHz isolated inverters with efficiencies around 90%.

However, it is being realized that to reduce the cost even further, the inverter design should have a universal element to it; i.e., a technology that is applicable not only to photovoltaic or fuel cell (PV/FC/wind) type sources, but also suitable for other traditional inverter applications with comparable specifications. The power density of the inverters should operate at higher switching frequency without sacrificing efficiency and without adding significantly to the cost. Approaches to reduce filter size or eliminate them without compromising performance factors would provide additional benefits.

Among possible topologies, a high-frequency-link (HFL) pulse-width-modulated (PWM) converter can eliminate the intermediate LC filter that is needed for a conventional high-frequency (HF) fixed-dc-link converter approach. Further, as compared to a resonant-link inverter, it yields lower switch stress, better total harmonic distortion (THD), and simpler all-device structure (e.g., no passive components in power stages). Thus, the PWM HFL converter approach is better suited from the viewpoints of cost, efficiency, and portability.

One HFL converter topology in the art is a cycloconverter-type HFL (CHFL) converter, which reduces conversion complexity by directly placing a cycloconverter to the secondary side of an HF transformer. Another topology is a rectifier-type HFL (RHFL) converter. The RHFL possesses a structure similar to that of a conventional fixed-dc-link converter except for the absence of the de-link filter. It can be thought of as a distributed version of the CHFL topology.

Cycloconverter-type inverters eliminate intermediate dc-link filters, and thus reduce parts count. However, operation of such a scheme involves rectifier diodes, which experience reverse recovery losses if the inverter operates at high switching frequencies. Furthermore, the output voltage and output current polarities need to be sensed, as two different switching schemes are required for unity and non-unity power-factor loads. This is because, for the latter case, there are time durations during which the output voltage and output current have opposite signs. This leads to complex operational logic. Further, the differences in the switching actions makes it apparent that additional switching for the non-unity-power-factor case leads to additional switching losses for the ac/ac converter, which can limit efficient operation at much higher frequencies of inverter operation.

SUMMARY OF THE INVENTION

Embodiments of the present invention provide, among other things, a method for operating an ac/ac converter circuit for a high-frequency-link converter having a high-frequency-link transformer coupled to a primary side converter and a secondary side converter. The HFL converter can be either a cycloconverter-type (CHFL) or a rectifier-type (RHFL), and can be either half-bridge or full bridge, and single phase or multiple phases. The secondary side converter comprises the ac/ac converter circuit for converting an ac input voltage to an ac output voltage. The ac input voltage varies between zero and a positive/negative dc voltage. A leg of the ac/ac converter circuit comprises first and second arms, and each arm comprises a pair of switches.

According to an example method, during a time when the ac input voltage is zero, each of the pair of switches for both the first and second arms are caused to be on, wherein current flows through the first arm along a first direction and through the second arm along a second, opposite, direction. Next, during a time when the ac input voltage is zero, a selected switch in the second arm is caused to be turned off. The position of the switches can be maintained as the ac input voltage transitions to the positive or negative dc level, reaches the positive or negative dc level, approaches zero, and again reaches zero. As the ac input voltage transitions to the positive or negative dc level a current direction through the second arm is reversed. When the ac input voltage reaches the positive or negative do level, the ac input voltage is blocked from the second arm. During a time when the ac input voltage approaches zero until a time when the ac input voltage again reaches zero, the output capacitance of the selected switch of the second arm discharges, and current flows through the second arm in the original direction. When the ac input voltage again reaches zero, the selected switch for the second arm is caused to be turned on.

DETAILED DESCRIPTION

Figure 1:
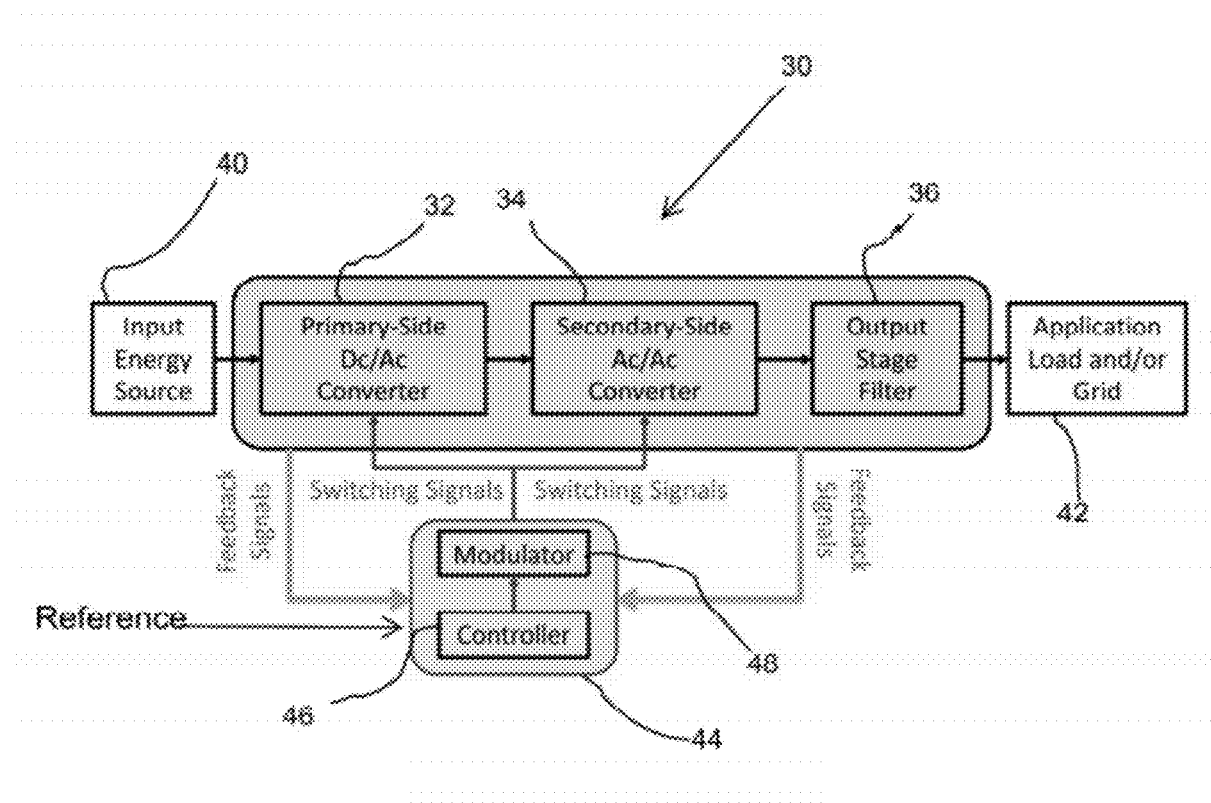
FIG. 1 shows a cycloconverter-type high-frequency-link converter, according to an embodiment of the present invention.

Example embodiments of the present invention provide, among other things, a zero-voltage-switching (ZVS) scheme for an ac/ac converter that mitigates enhanced ac/ac-converter losses at frequencies much higher than 20 kHz. During turn-on and turn-off of switches, if the product of switch current and switch voltage is zero, then the switch is said to undergo a "soft switching," or else it is "hard switching." If the current approaches zero before the voltage, the soft switching mechanism is called zero-current switching (ZCS). If the voltage goes to zero before the current, the soft switching mechanism is called zero-voltage switching (ZVS).

Methods are provided according to example embodiments of the present invention for a high-frequency link converter having a high-frequency link transformer coupled to a primary side converter and a secondary side converter. The secondary side converter comprises an ac/ac converter circuit for converting an ac input voltage, varying between zero and a positive or negative dc voltage, to an ac output voltage. This ac input voltage is bipolar and tristate. The ac/ac converter circuit includes at least one leg, where each leg includes first and second arms. Each arm includes at least one switch, and preferably switches, e.g., first and second switches, for controlling current flow to the arms.

An example method for operating the ac/ac converter circuit provides a sequence for controlling the switches for the first and/or second arms. Note that the particular switches for the ac/ac converter that provide the "first" and "second" switches and the "first" and "second" arms can vary depending on, for example, unity or non-unity power factor load, phase, etc.

In an example method for operating the ac/ac converter circuit, during a time when the ac input voltage is zero, the first and second switches for both the first and second arms are caused to be on. This can cause output current from the primary side converter to be shared equally between the first and second arms. Next, and during a time when the ac input voltage is zero, a selected switch of the second arm is caused to be turned off. Next, the ac/ac converter circuit is caused to receive the ac input voltage during a time when the ac input voltage transitions to a dc level (which can be positive or negative, depending on the particular method) until a time during which the selected switch of the second arm blocks the ac input voltage. During this time, a current direction through the second arm is reversed, and an output capacitance of the first switch of the second arm is charged.

Next, the ac/ac converter circuit is caused to receive the ac input voltage until a time during which the primary-side converter attains a zero state and the ac input voltage approaches zero voltage. During this part of the sequence, prior to the primary-side converter attaining a zero state; current to the second arm is blocked, such as by the selected switch of the second arm. The first and second switches of the first arm support the output current from the primary side converter.

The ac/ac converter is then caused to receive the ac input voltage from a time during which the ac input voltage approaches zero until a time during which the ac input voltage is zero. During the time that the ac input approaches zero, the output capacitance of the selected switch of the second arm discharges, and current flows through the second arm in the original direction. The output capacitance can be clamped by an antiparallel diode. Next, while the ac input voltage is zero, the first switch of the second arm is turned on, completing the half-switching cycle.

This half-switching cycle can be extended to provide a full switching sequence, a switching sequence for unity power-factor or non-unity power-factor, a switching sequence for a half-bridge or full-bridge, and/or a switching sequence for multiple phases. As a nonlimiting example, if the dc voltage in the above sequence is positive, by then repeating the above half-switching sequence for a negative dc voltage but turning off a selected switch on the first arm when the ac input voltage is zero, a full switching sequence can be performed. As another example, if the ac/ac converter includes multiple legs, each leg can be operated according to the inventive sequence. This can be used to provide a full-bridge switching scheme and/or a multiple-phase switching scheme.

A converter is provided according to embodiments of the present invention. The example converter includes a primary-side converter, a high-frequency-link transformer coupled to the primary-side converter, and a secondary-side ac/ac converter circuit coupled to the high-frequency-link transformer. The ac/ac converter circuit comprises at least one leg, each leg having first and second arms, and each arm having first and second switches. An output stage filter is coupled to the ac/ac converter circuit for filtering an output voltage provided by the ac/ac converter circuit. A control stage is provided for operating the secondary-side ac/ac converter circuit. The operation can be according to the sequence(s) described above or elsewhere herein.

Example schemes provide a convenient solution that is applicable for both unity and non-unity-power-factor loads using only one switching strategy, unlike conventional schemes. By limiting the need for diode operation except during transition, reverse-recovery losses can be mitigated, and electromagnetic interference (EMI) can be reduced. Further, unlike conventional schemes that include a diode-rectifier stage followed by a full-bridge converter on the secondary side, example schemes according to the present invention enable bi-directional flow. Hence, the applicability of example methods and converters extends beyond PV and FC applications.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

FIG. 1 shows an example cycloconverter-type high-frequency link (CHFL) converter 30 according to an embodiment of the present invention. Generally, the converter 30, for example a high-frequency-link inverter, includes a primary-side converter such as a dc/ac converter 32, a secondary-side ac/ac converter circuit (secondary side ac/ac converter) 34, and an output stage filter 36 coupled to the secondary side ac/ac converter for filtering an output voltage of the secondary side ac/ac converter. It is contemplated that the primary-side converter and/or the secondary side converter can include other converters, bridges, and/or inverters as well, as will be appreciated by those of ordinary skill in the art, and converters having these additional components are believed to be within the scope of the present invention. As also shown in the example topology of FIG. 2, the primary side converter 32 and the secondary side ac/ac converter 34 are coupled to a high-frequency-link transformer 38, so that the primary-side converter leads (directly or indirectly) to the transformer and the transformer leads to the secondary side ac/ac converter, as is known in the art. The example converter 30 is coupled to an input energy source 40 for receiving a power input, and is coupled to an output such as an application load and/or grid 42. If the converter 30 is to be used for other applications, it may be coupled to other components as well.

A control stage 44 is provided for operating the primary-side converter 32 and the secondary side ac/ac converter 34. The example control stage 44 shown in FIG. 1 provides a closed-loop-control based switching sequence generation scheme using a two-stage approach. Particularly, the control stage 44 includes a controller 46, which may be embodied by a configured circuit board, chip, etc., for generating control signals. The control signals are generated based on reference signals that provide the desired control objectives and real-time feedback signals from both the primary-side dc/ac converter 32 and the secondary-side ac/ac converter 34 to ascertain the measure of the difference between desired and actual performance. The controller 46 output is fed to a modulator block 48, which may be embodied by a suitably configured circuit board, chip, or other suitable circuit, to generate the switching signals for the switches in the inverter. Particularly, the modulator 48 in the example configuration shown in FIG. 1 provides the switching signals to implement switching sequences for the converter switches.

Figure 2:
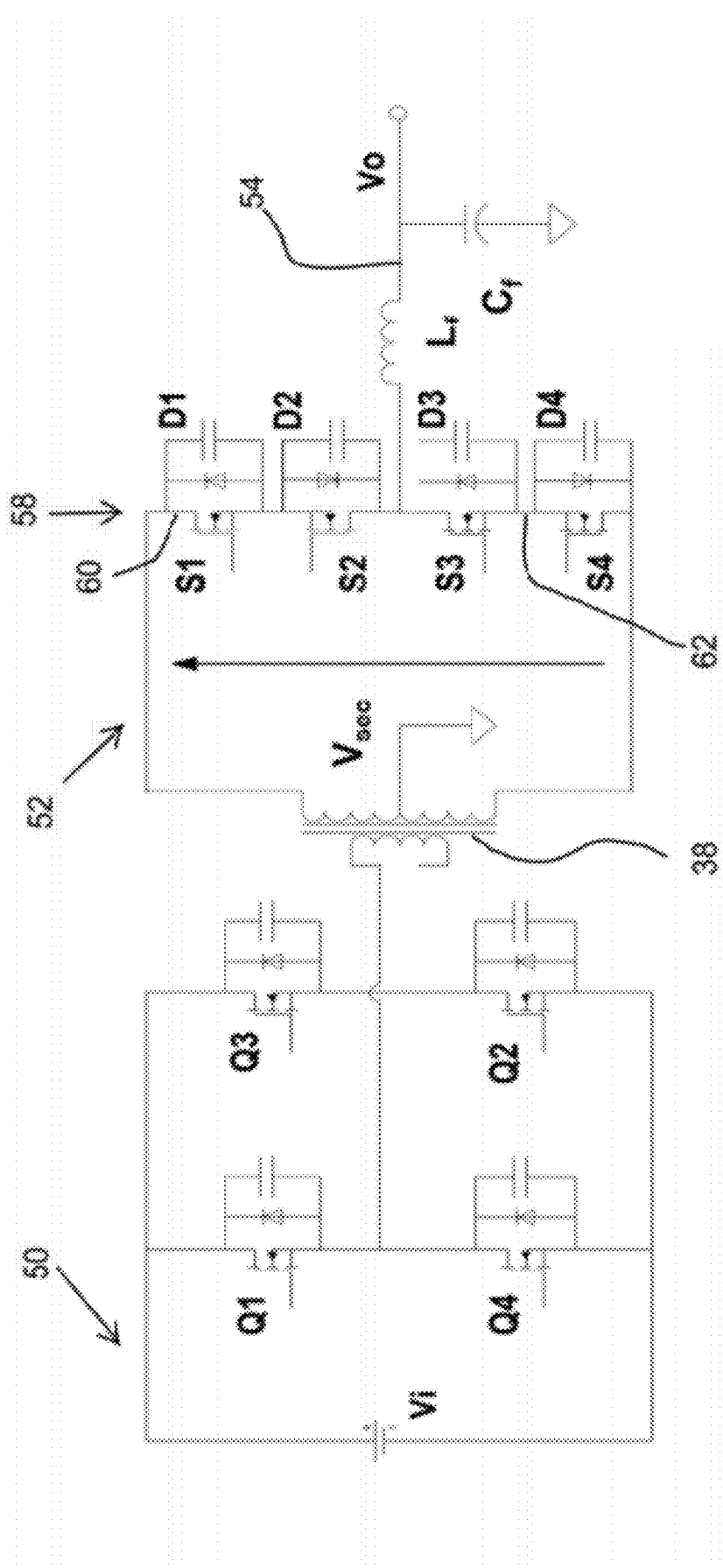
FIG. 2 shows components of an example cycloconverter-type high-frequency-link converter.

For purposes of illustrating a control method according to an embodiment of the present invention, FIG. 2 shows a nonlimiting example CHFL topology for the converter, including a primary side converter 50, the HFL transformer 38, a secondary side ac/ac converter 52, and an output filter 54. The primary side converter 38 is embodied in a full-bridge dc/ac converter including a plurality of switches Q1, Q2, Q3, and Q4 for controlling the primary side converter. The dc/ac converter 38 produces an HF bipolar voltage ($V_T$ or $V_{sec}$) across the transformer 38 using (in this example) sinusoidal pulse-width modulation. Bipolar voltage is used per switching cycle to ensure transformer flux balance. The primary side converter 38 can be controlled using methods known to those of ordinary skill in the art. As nonlimiting examples, the primary side converter 38 can be controlled by the control stage 44 according to the methods described in S. Deng, H. Mao, J. Mazumder, I. Batarseh, and K. Islam, "A new control scheme for high frequency link inverter design," in IEEE Applied Power Electronics Conference, pp. 512-517, 2003, and/or the methods described in S. K. Mazumder, R. Burra, R. Huang, M. Tahir, K. Acharya, G. Garcia, S. Pro, O. Rodrigues, and E. Duheric, "A high-efficiency universal grid-connected fuel-cell inverter for residential application," IEEE Transactions on Industrial Electronics, vol. 57, no. 10, pp. 3431-3447, 2010, both of which are incorporated in their entirety by reference herein. The present invention is not intended to limited to a particular method for operating the primary side converter 38.

The secondary side ac/ac converter 52, which in the nonlimiting example shown in FIG. 2 is a half-bridge ac/ac converter, includes a leg 58 having a first arm (as shown, upper arm) 60 and a second arm (as shown, lower arm) 62. It should be understood that "first" and "second" are used for purposes of illustration, and are not intended to require a particular order. For example, it is contemplated that the lower arm 62 could be referred to as a "first" arm and the upper arm 60 could be referred to as a "second" arm. The first arm 60 includes first and second switches S1, S2 in back-to-back mode, with the terms "first" and "second" also used for purposes of explanation and not to require a particular order. Similarly, the second arm 62 includes first and second switches S3, S4 in back-to-back mode. Switches S1, S2, S3, and S4 each may, but need not in all cases, include (external and/or internal) parallel capacitors and antiparallel diodes, labeled D1, D2, D3, and D4 respectively. Gates for each of the switches S1, S2, S3, and S4 are coupled to the output of the control stage 44 for controlling operation of the ac/ac converter 52 via gating signals. Nonlimiting example switches include MOSFET/JFET with internal (built-in) antiparallel diodes, with or without parallel external capacitors across each switch, and/or IGBTs or BJTs with external antiparallel diodes, with or without a parallel external capacitor across each switch.

The ac/ac converter 52 is supplied with an ac input voltage $V_{sec}$ across the transformer secondary. This input voltage is a bipolar voltage. For example, the ac input to the ac/ac converter 52 can be bipolar and tristate (e.g., +, 0, − dc voltage levels). The width of each ac/ac converter input pulse in a switching period can be varied based on sinusoidal modulation. The ac/ac converter 52 processes this ac input voltage and provides an ac output voltage $V_o$ at least in part by controlling the switches S1, S2, S3, and S4. Feedback can be supplied to the control stage 44 from the ac/ac converter for assistance with control. According to embodiments of the present invention, the switches S1, S2, S3, and S4 are controlled using a zero-voltage-switching (ZVS) scheme to reduce switching loss.

Figure 3:
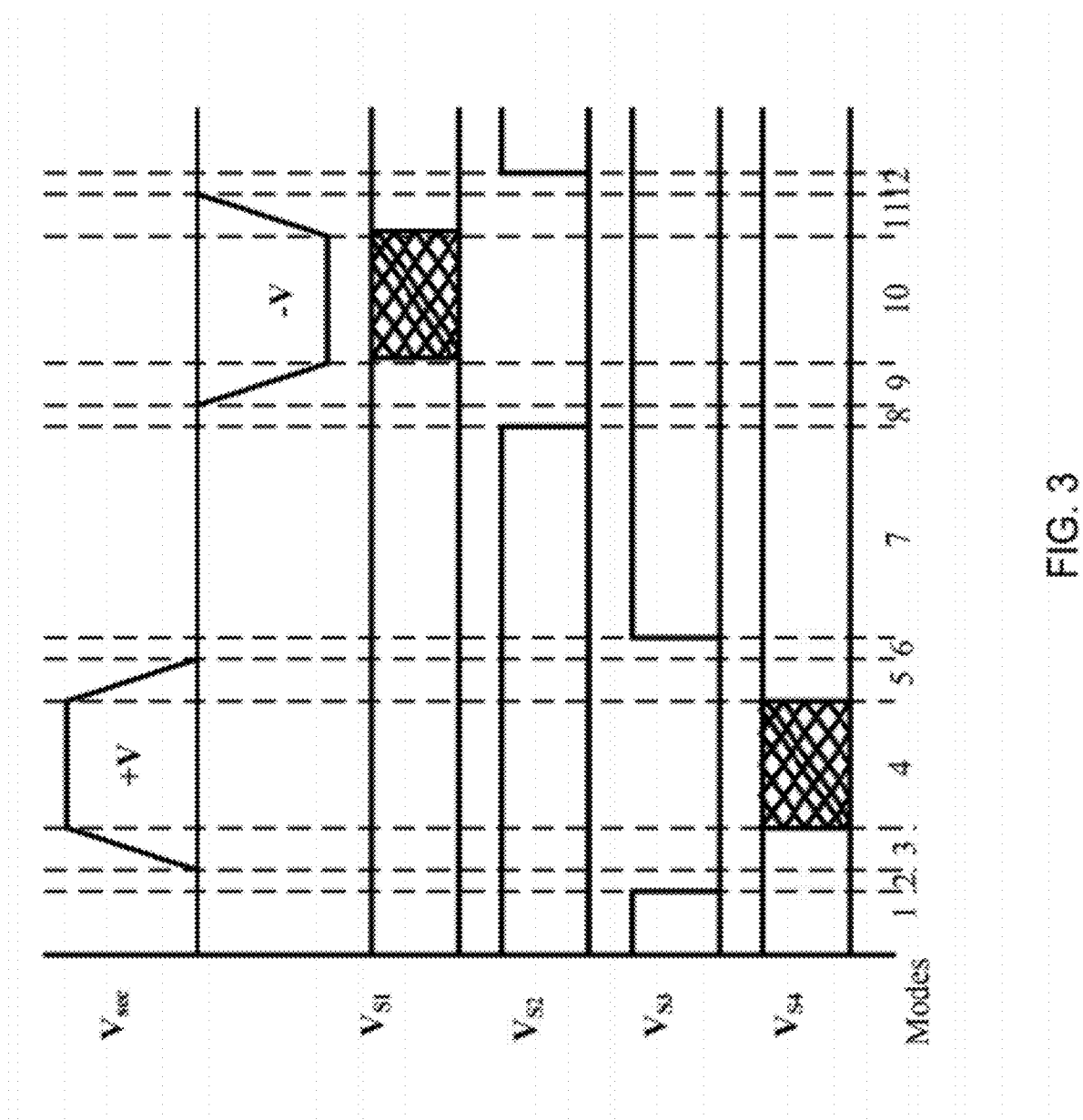
FIG. 3 shows gating signals for a zero-voltage-switching (ZVS) operating method for a half-bridge ac/ac converter for a cycloconverter-type high frequency-link converter during twelve operating modes providing a full switching cycle, according to an embodiment of the present invention, where the bipolar transformer secondary voltage is positive/negative.

FIG. 3 shows an example ZVS scheme embodied in a switching sequence for the ac/ac converter 52 according to an embodiment of the present invention when the bipolar secondary voltage is positive/negative. FIGS. 4A-4L show example operating modes for bipolar positive/negative output current for the example converter 52.

Figure 4A:
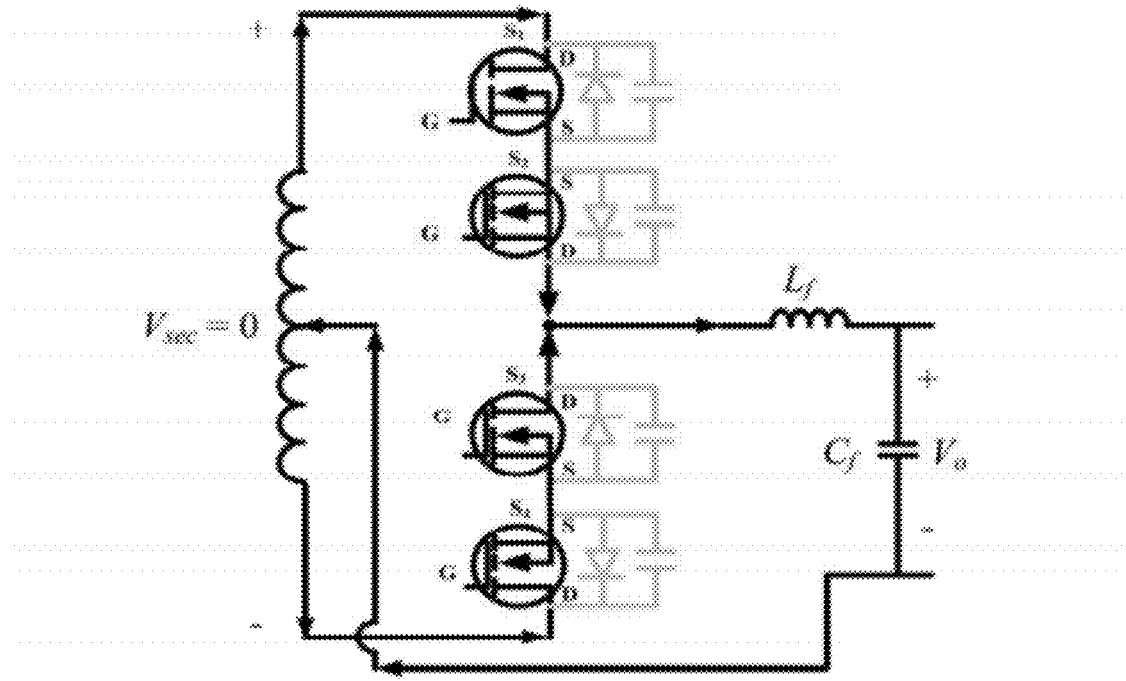
FIGS. 4A-4L show current flows for each of the twelve operating modes shown in FIG. 3, respectively, as applied to the converter shown in FIG. 2.

During Mode 1, as shown in FIG. 4A, the transformer secondary voltage ($V_{sec}$) is zero. All of the ac/ac-converter switches S1, S2, S3, S4 are caused to be on (for example, gating signals can be supplied to the switches to turn the switches on from an off state or to keep the switches on). As such, the output current from the transformer secondary is shared equally between the two arms 60, 62 of the half-bridge ac/ac converter 52. Current sharing between the two arms 60, 62 results in a lower conduction loss. Note that "equally" can be understood to also refer to substantially equally.

Figure 4B:
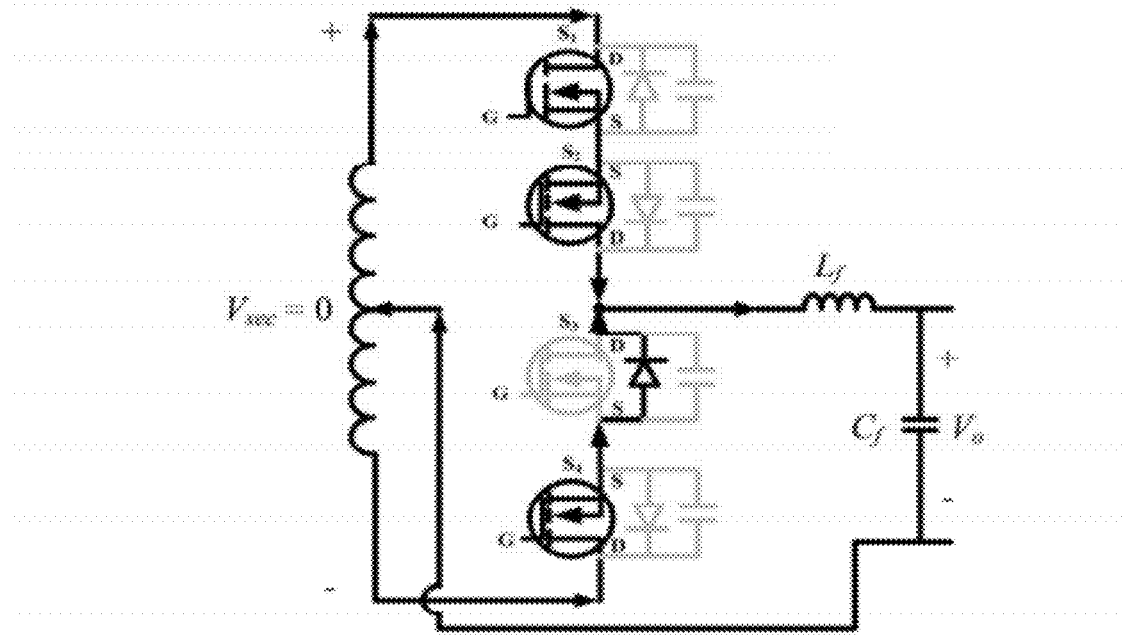

Mode 2, as shown in FIG. 4B, is a zero-state interval during which $V_{sec}=0$. "Zero" can be understood to mean zero or substantially zero. At the beginning of Mode 2, the switch S3 (in FIG. 2, a selected switch, as shown the first switch of the second arm 62), is turned off under ZVS condition.

Generally, the inverter 30 generates sinusoidally-modulated bipolar voltage at the output independent of the direction of current. Soft-switching ensures that commutation of current from the lower half of the ac/ac converter (such as converter 52) to its upper half and vice-versa during transition happens with reduced loss; in other words, that the switches that are turning on, do so with reduced or no switching loss, and so do the switches that are turning off. The current direction influences the way the current flows in the sets of switches depending on the desired voltage polarity at the output of the inverter, and the switch to be selected is based on this desired voltage polarity. Because the devices are connected in back-to-back mode, the switch is selected for a particular set that blocks the voltage when in the off state. Desired inverter voltage polarity also is used to determine whether for a given transformer secondary output voltage (i.e., bipolar and pulsating voltage) whether the first set or bottom set (e.g., first or second arms) of the ac/ac converter are selected.

During Mode 2, the other switches S1, S2, S4 remain on. Half of the output current that was flowing through the first (as shown, lower) arm 62 now begins to transfer to the second (as shown, upper) arm 60. Eventually, the first and second switches S1 and S2 for the upper arm 60 carry the output current.

Figure 4C:
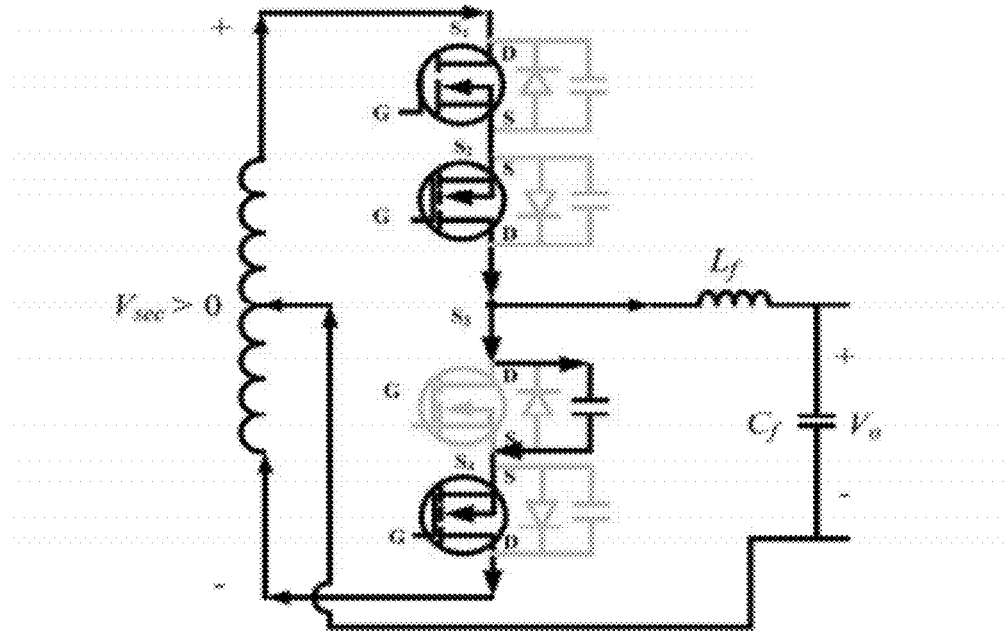

Mode 3, as shown in FIG. 4C, initiates when $V_{sec}$ rises from zero voltage to the (in this example, positive) dc level (as shown in FIG. 3). During this time, the switches S1, S2, and S4 remain on, while switch S3 remains off. This mode ends with switch S3 blocking $V_{sec}$ (shown in FIG. 4D). As shown in FIG. 4C, the current direction along the second arm 62 is reversed, and the output capacitance of switch S3 can charge.

Figure 4D:
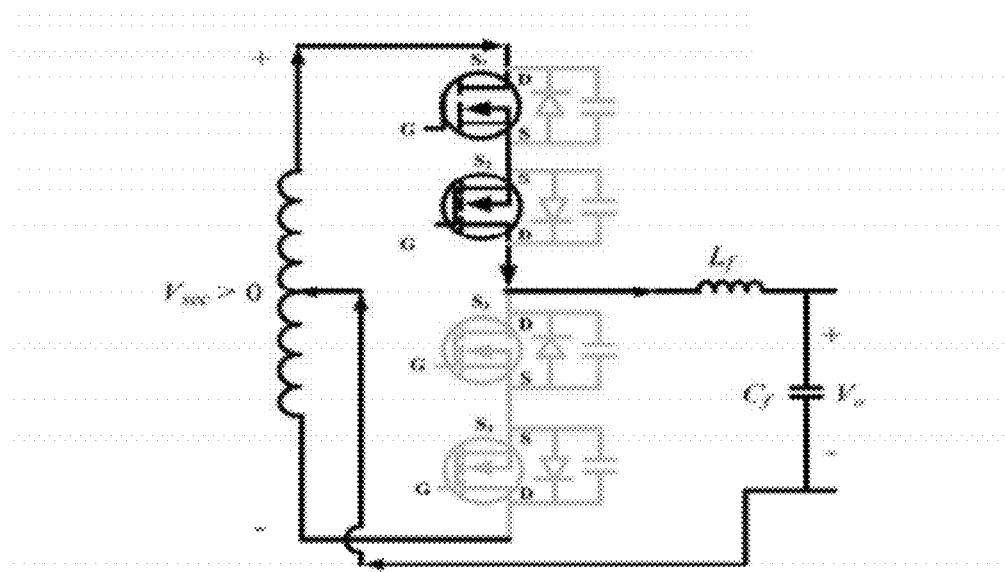

In Mode 4, as shown in FIG. 4D, the first and second switches of the first arm 60 (switches S1 and S2) support the output current. During this time, switches S1 and S2 remain on, while switch S3 remains off. Because switch S3 blocks $V_{sec}$, switch S4 can remain on or it can be turned off under zero-current condition.

Figure 4E:
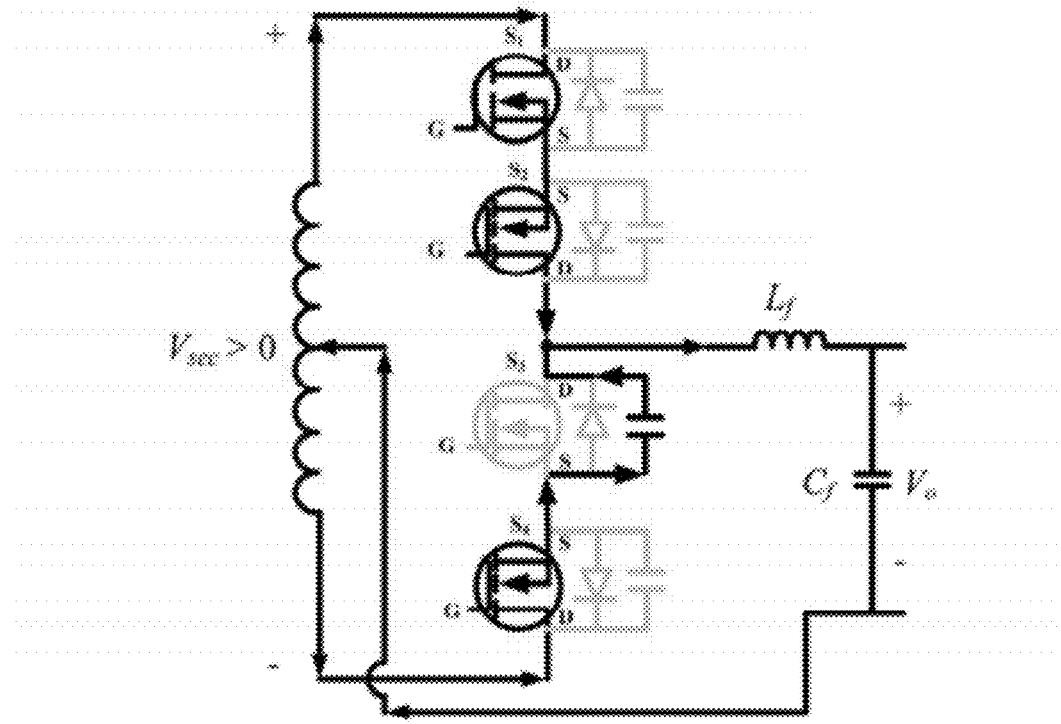

Mode 5, as shown in FIG. 4E, initiates when the primary-side converter 50 attains a zero state, and as such, $V_{sec}$ approaches zero voltage. Switches S3 remains off, and S1, S2, and S4 are on (S4 can be turned on if it was off during Mode 4). The output current is primarily supported by switches S1 and S2 while the output capacitance of switch S3 discharges, and eventually is clamped by the antiparallel diode D3 of S3. During this time, current flows across the second arm 62 along the original direction shown in FIG. 4A.

Figure 4F:
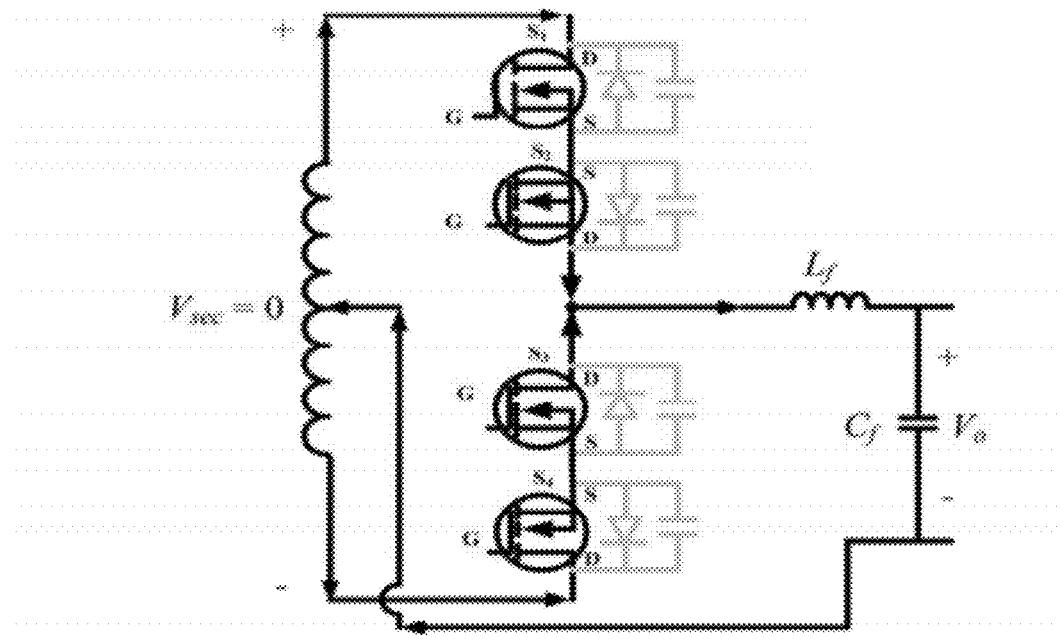

Mode 6, as shown in FIG. 4F, is similar to Mode 1, and is a zero-state interval. Switches S1, S2, and S4 remain on. This mode ends when switch S3 turns on under ZVS condition. Subsequently, the output current again is shared between the two arms 60, 62 of the ac/ac converter 50. At the end of this mode, a half switching cycle is achieved.

Figure 4G:
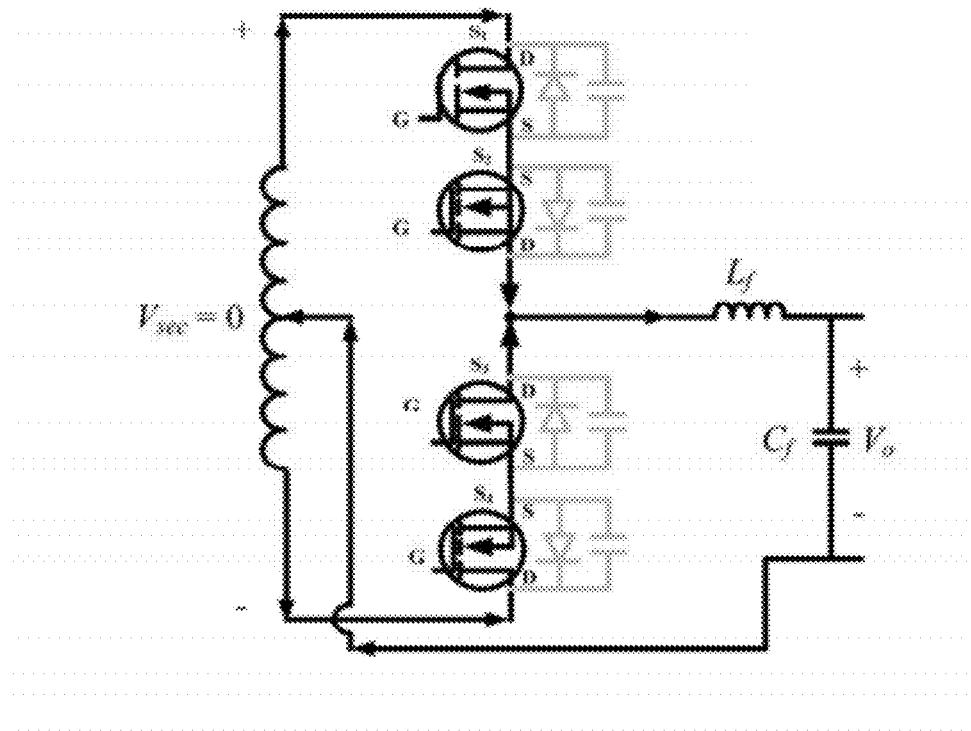

These first six modes can be expanded to provide a full switching scheme for operating when the bipolar transformer secondary voltage is positive/negative. This can done by generally repeating the first six modes set out above, but turning off (and then on) a selected switch for the other arm. Accordingly, Modes 7-12 are set out by example below:

During Mode 7, as shown in FIG. 4G, the transformer secondary voltage ($V_{sec}$) is again zero. All of the ac/ac-converter switches S1, S2, S3, S4 are caused to be on.

Figure 4H:
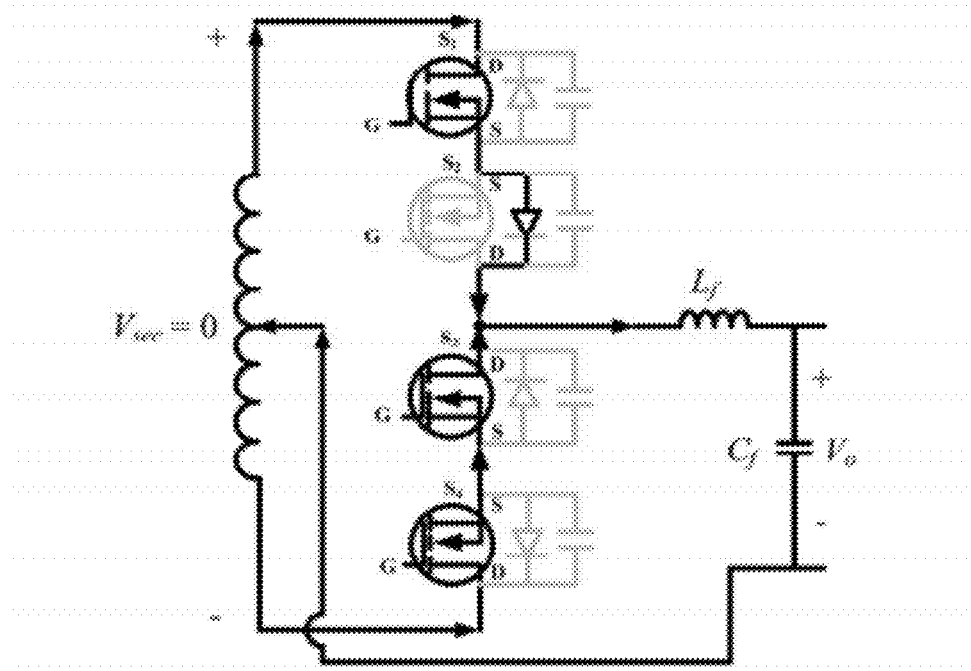

Mode 8, as shown in FIG. 4H, is a zero-state interval during which $V_{sec}=0$. At the beginning of Mode 8, a selected switch of the upper arm 60, the switch S2 (in FIG. 2, the second switch of the first, upper arm 60), is turned off under ZVS condition. The other switches S1, S3, S4 remain on. Half of the output current that was flowing through the upper arm 60 now begins to transfer to the lower arm 62. Eventually, the first and second switches S3 and S4 for the lower arm 62 carry the output current.

Figure 4I:
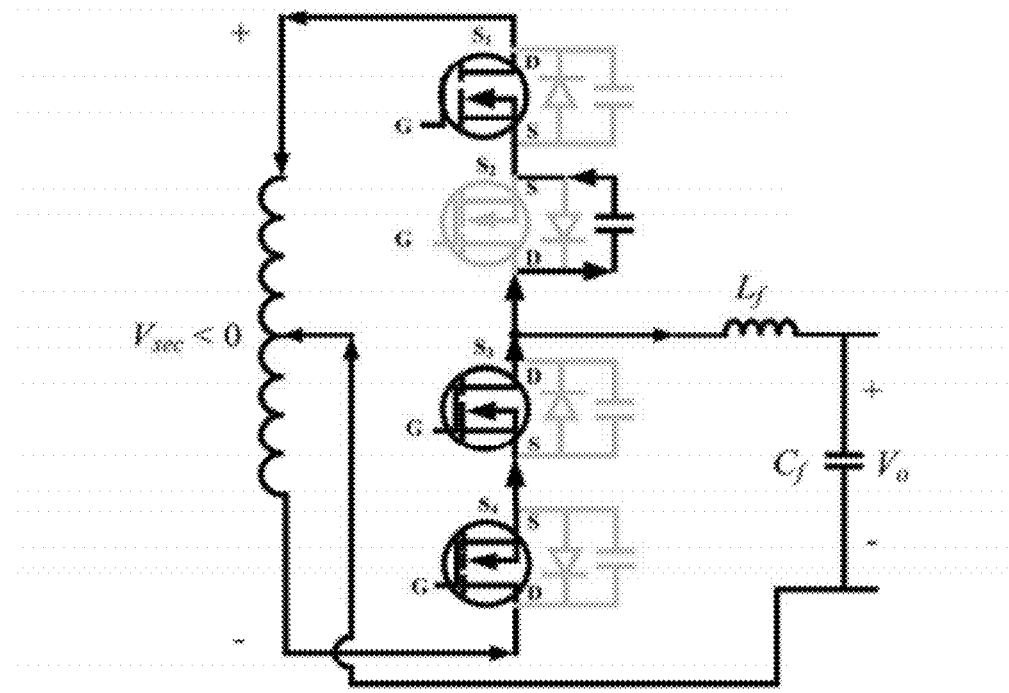

Mode 9, as shown in FIG. 4I, initiates when $V_{sec}$ falls from zero voltage to (as shown, negative) dc level (as shown in FIG. 3). During this time, the switches S1, S3, and S4 remain on, while switch S2 remains off. This mode ends with switch S2 blocking $V_{sec}$. As shown in FIG. 4I, the current direction along the first arm 60 is reversed, and the output capacitance of switch S2 can charge.

Figure 4J:
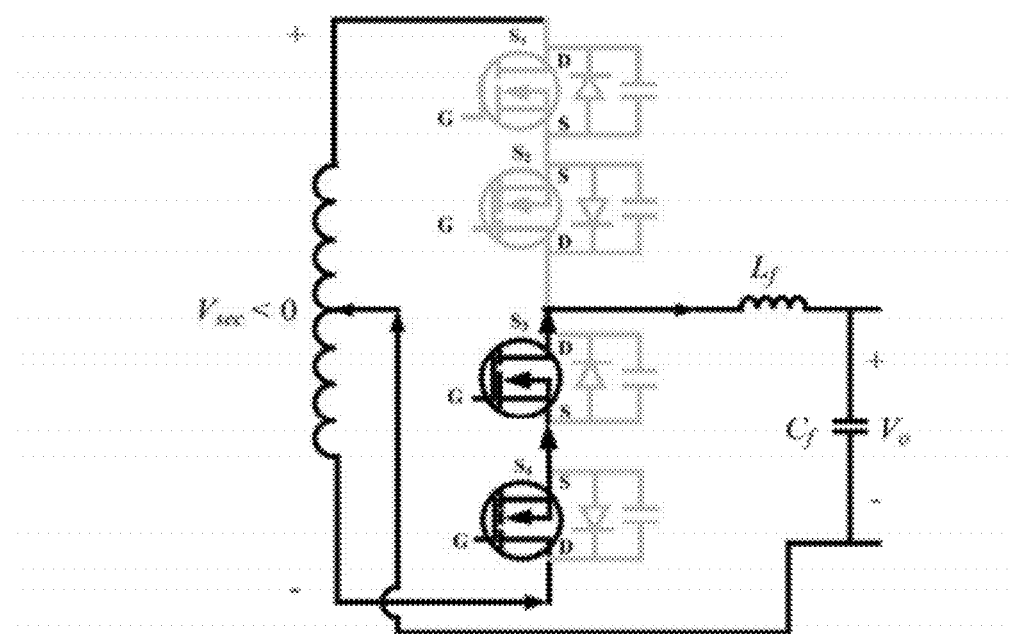

In Mode 10, as shown in FIG. 4J, the first and second switches of the second arm 62 (switches S3 and S4) support the output current. During this time, switches S3 and S4 remain on, while switch S2 remains off. Because switch S2 blocks $V_{sec}$, switch S1 can remain on or it can be turned off under zero-current condition.

Figure 4K:
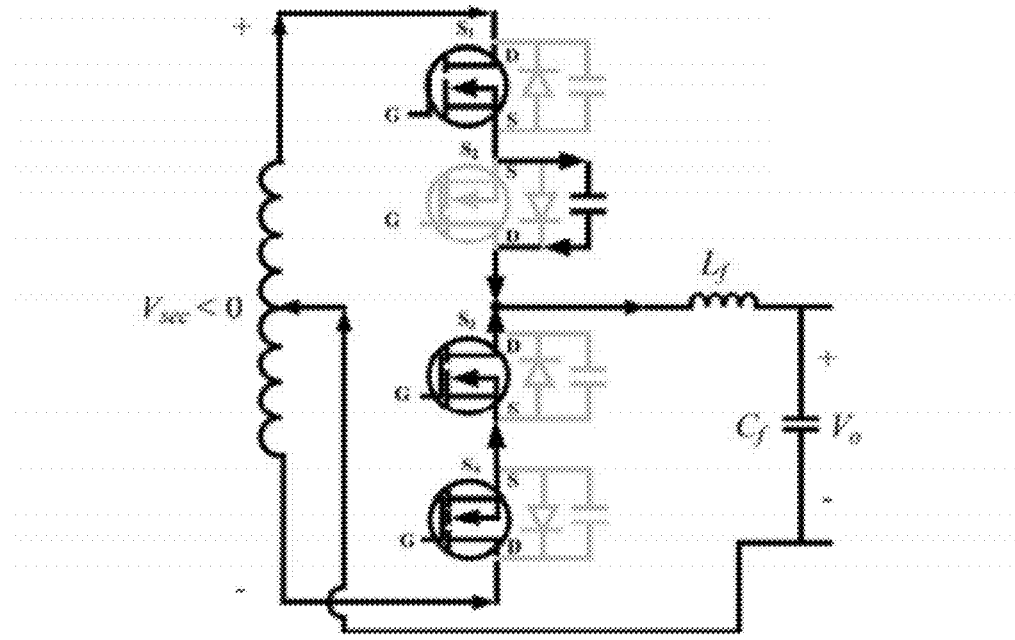

Mode 11, as shown in FIG. 4K, initiates when the primary-side converter 50 attains a zero state, and as such, $V_{sec}$ approaches zero voltage. Switch S2 remains off, and S1, S3, and S4 are on (S1 can be turned on if it was off during Mode 10). The output current is primarily supported by switches S3 and S4 while the output capacitance of switch S2 discharges, and eventually is clamped by the antiparallel diode D2 of S2. During this time, current flows across the first arm 60 along the original direction shown in FIG. 4A.

Figure 4L:
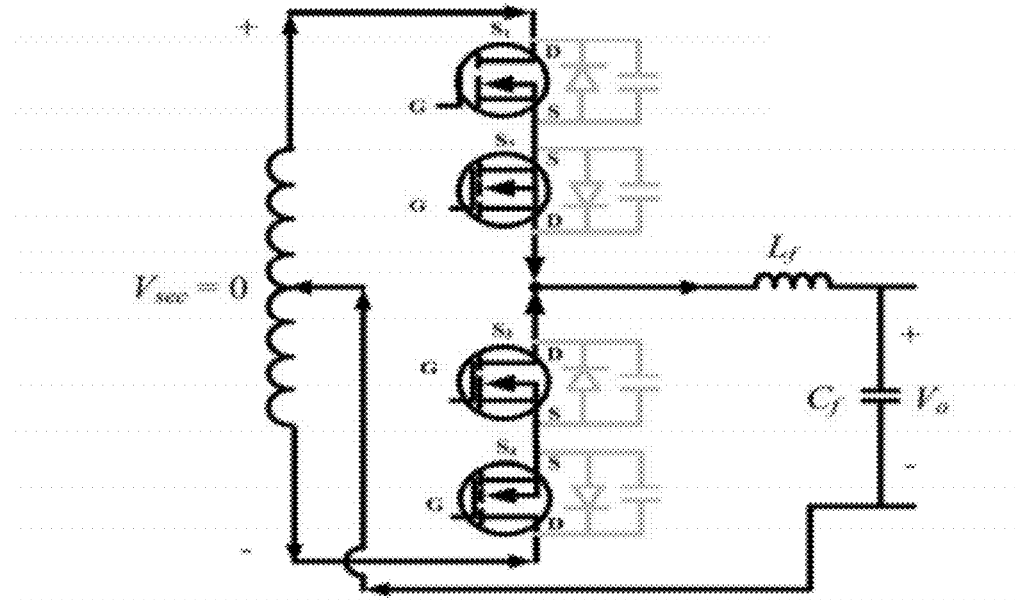
Figure 5A:
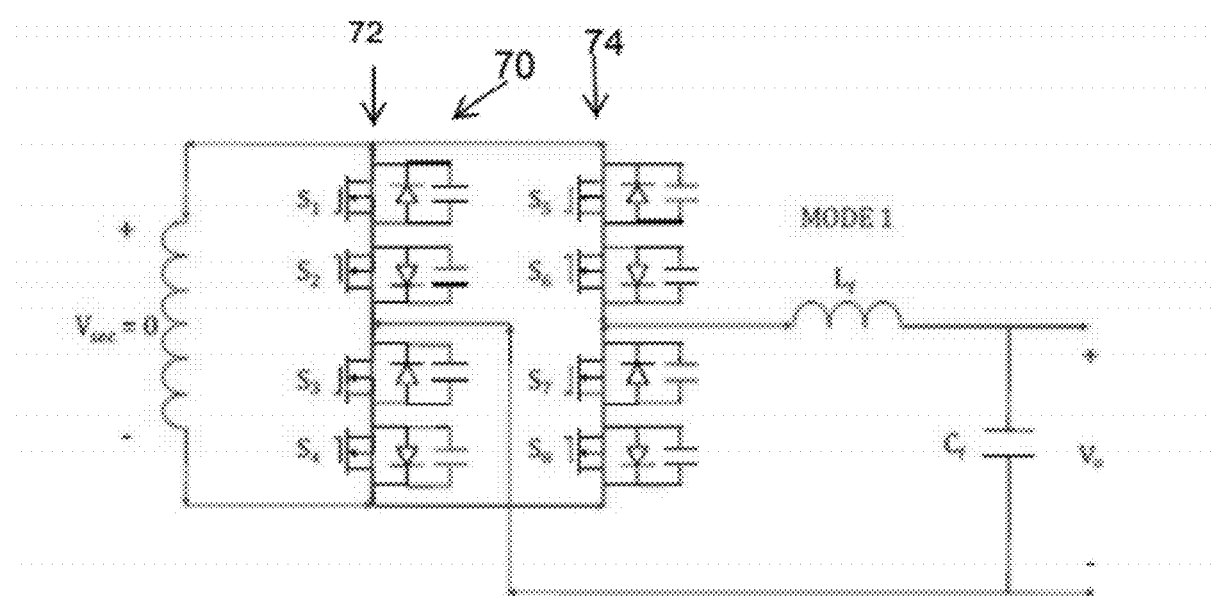
FIGS. 5A-5F show current flows for six operating modes, respectively, for a full-bridge ac/ac converter, according to an embodiment of the present invention.
Figure 5B:
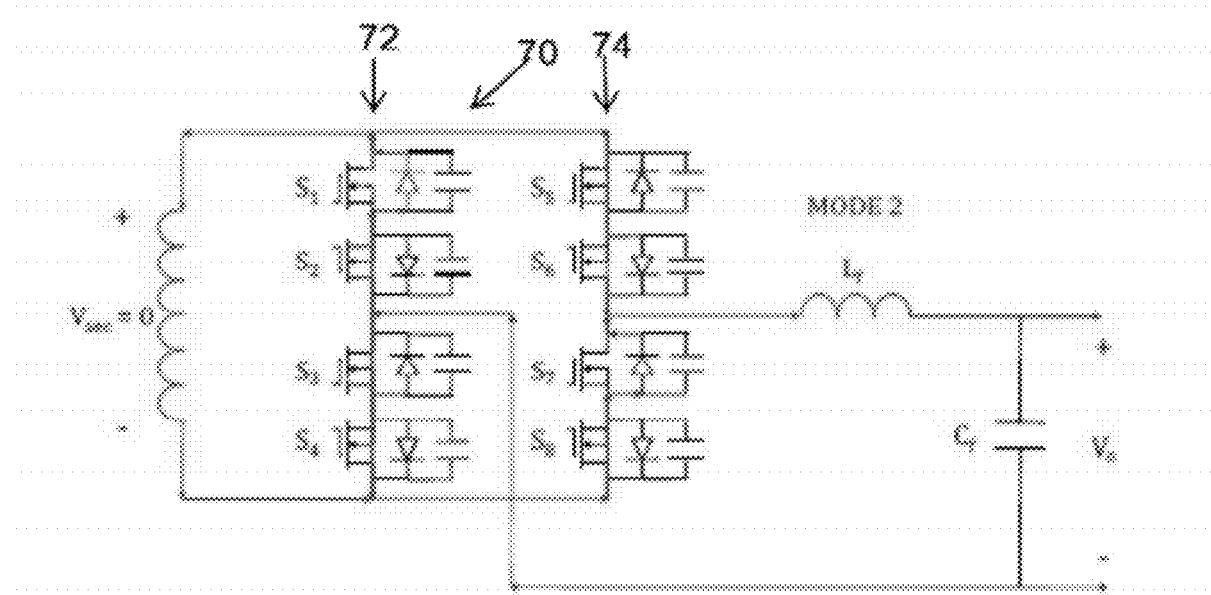
Figure 5C:
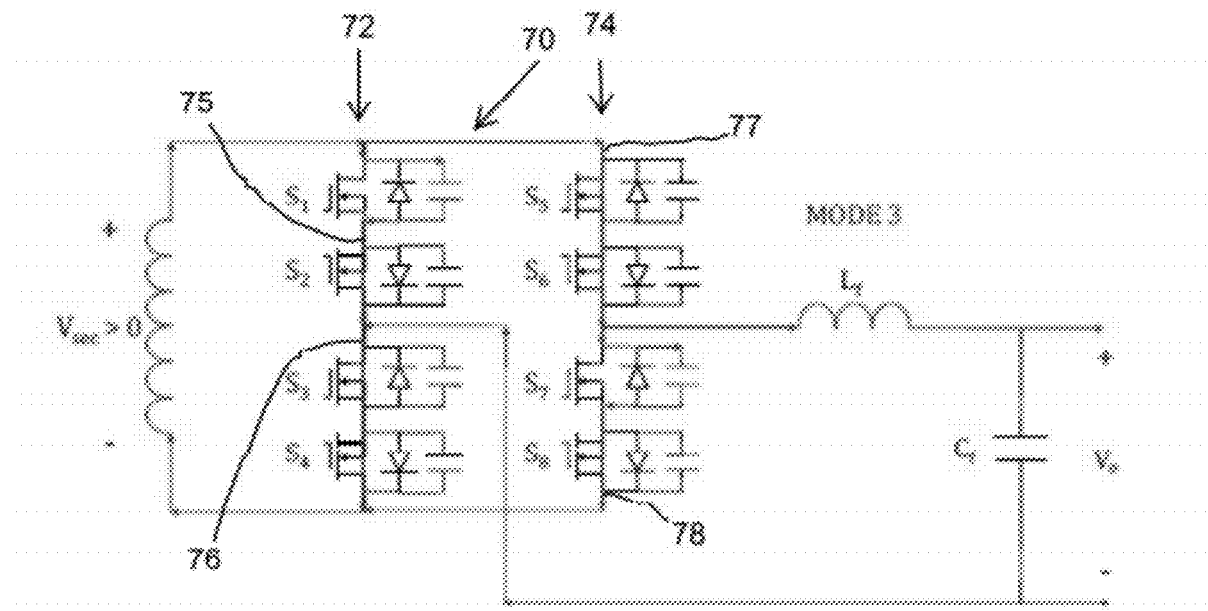
Figure 5D:
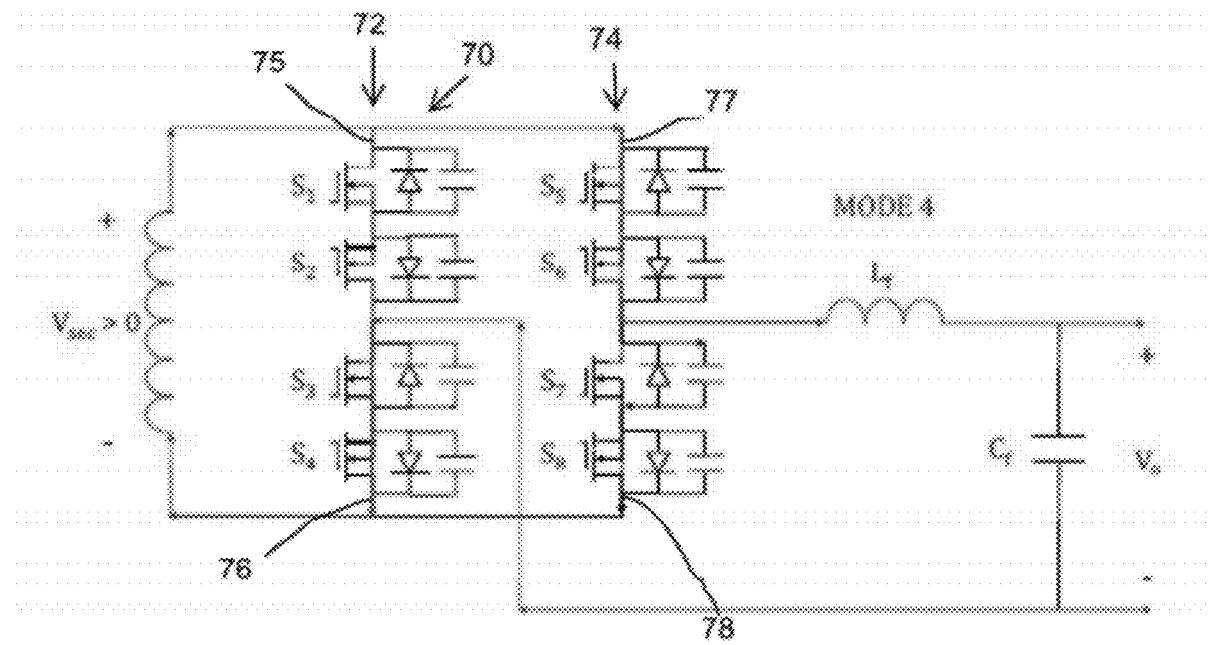
Figure 5E:
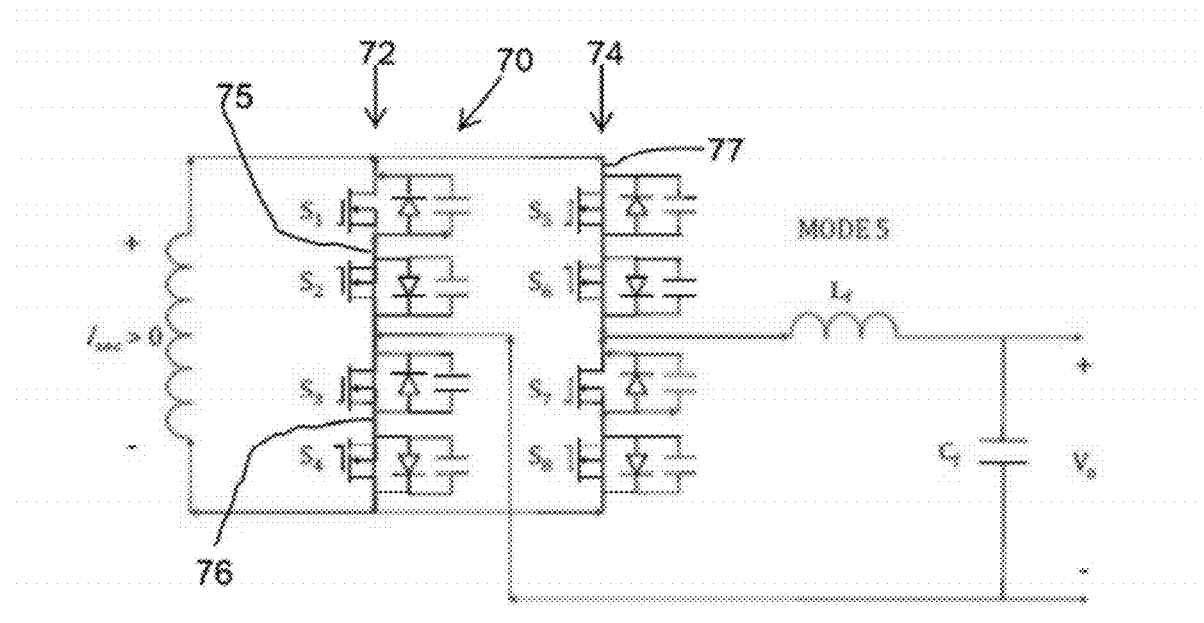
Figure 5F:
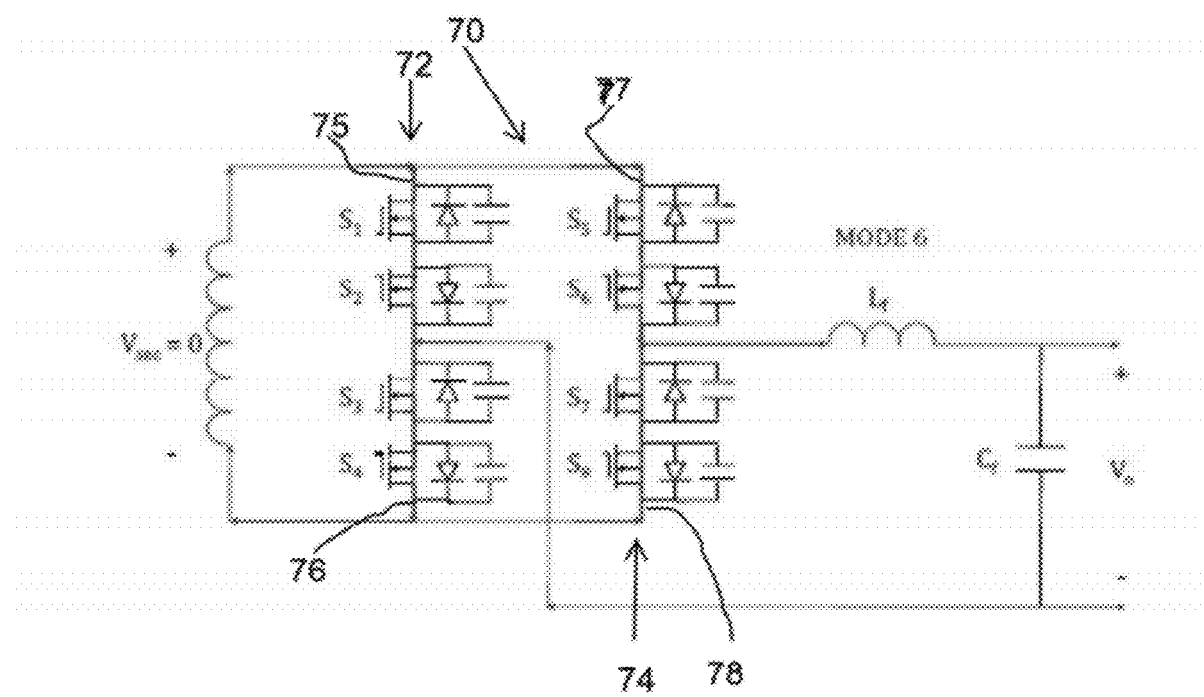

Mode 12, as shown in FIG. 4L, is similar to Mode 7, and is a zero-state interval. Switches S1, S3, and S4 remain on. This mode ends when switch S2 turns on under ZVS condition. Subsequently, the output current again is shared between the two arms 60, 62 of the ac/ac converter 50. Modes 1-12 can be repeated.

The switching scheme shown in FIG. 3 can also be extended to a full-bridge ac/ac converter circuit topology according to another embodiment of the present invention. FIGS. 5A-5F show example modes of operation for a full-bridge ac/ac converter 70. The full bridge converter 70 includes two legs 72, 74, each having first and second arms (arms 75, 76 for leg 72, and arms 77, 78 for leg 74), and switches S1, S2, S3, S4 (for leg 72) and S5, S6, S7, S8 (for leg 74). As shown in FIGS. 5A-5F, for the first leg 72, Modes 1-6 above are generally followed, except that the switch turned off and on during ZVS condition is switch S1 (first switch of first (upper) arm). Similarly, for the second leg 74, Modes 1-6 above are generally followed, except that the switch turned off and on during ZVS condition is switch S7 (first switch of second (lower) arm).

Figures 6A, 6B:
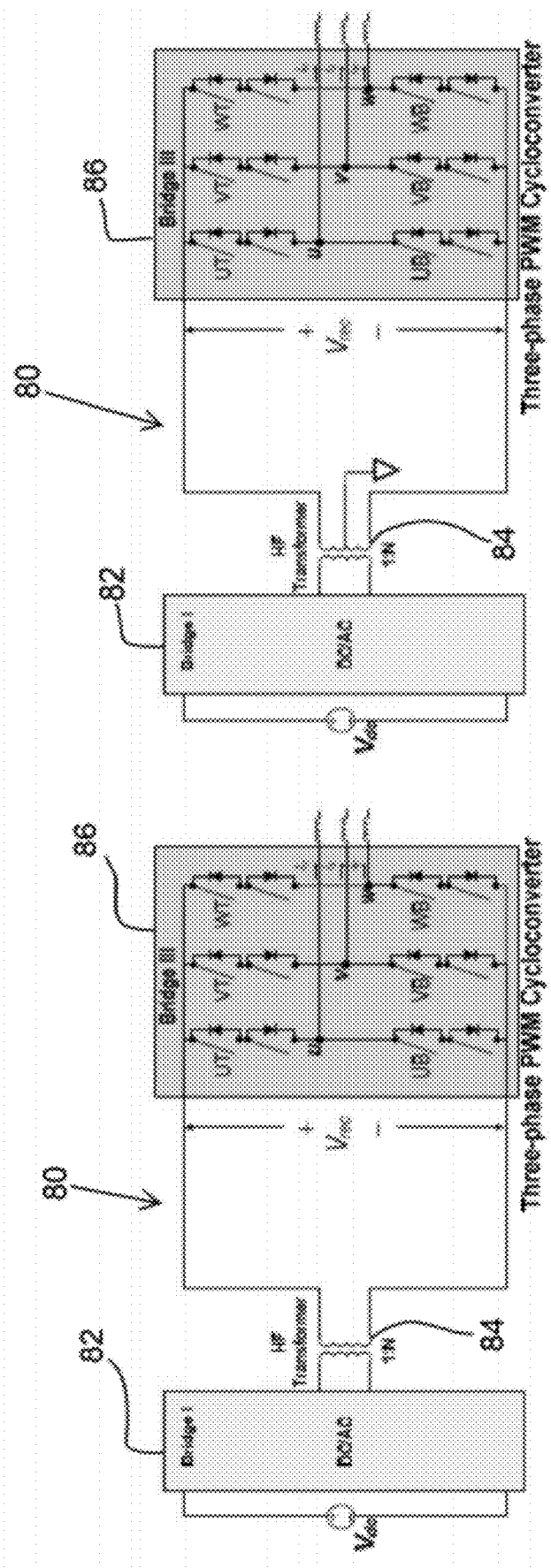
FIGS. 6A-6B show topologies for a three-phase PWM cycloconverter-type high-frequency link converter.
Figure 7:
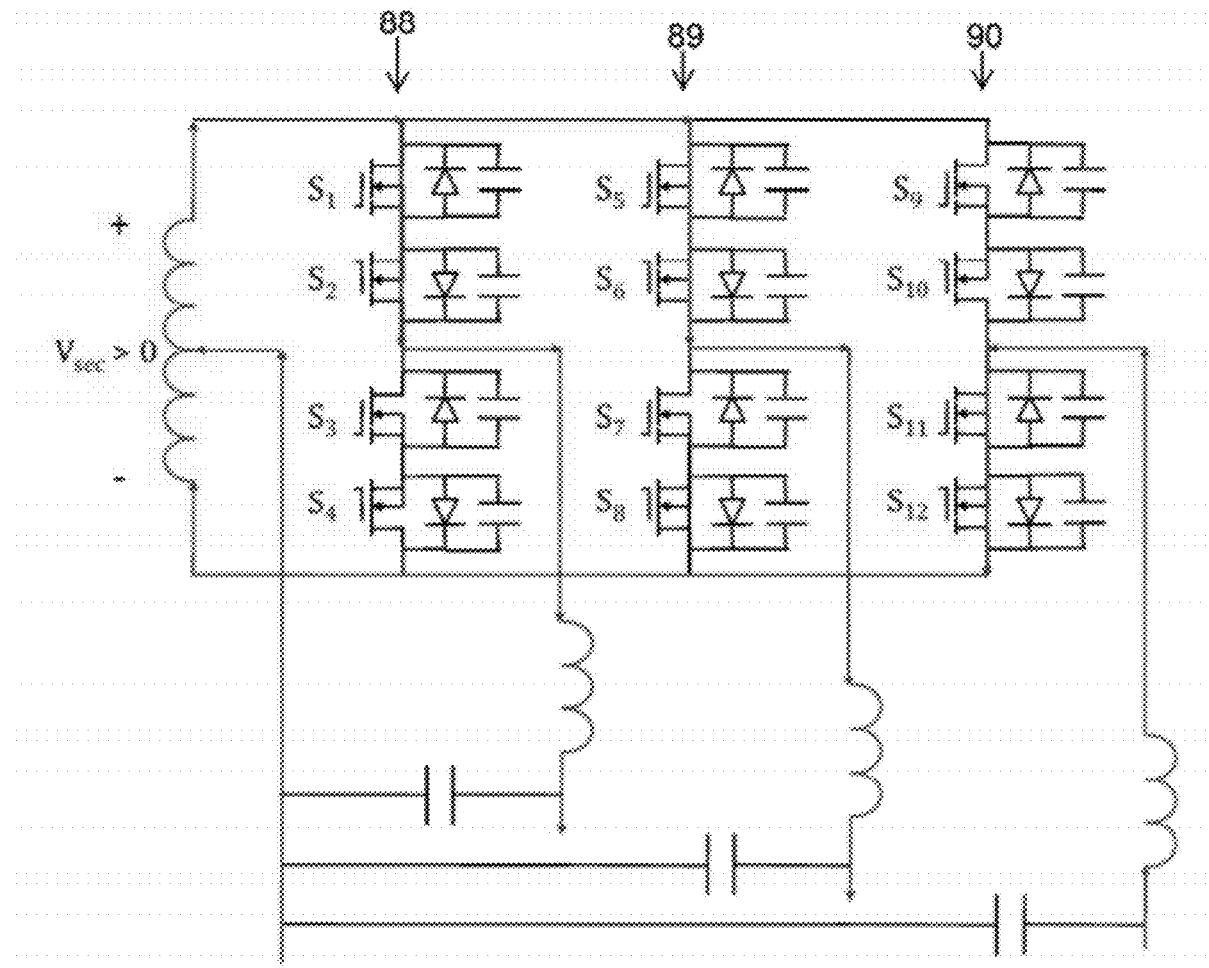
FIG. 7 shows an example three-phase PWM cycloconverter type high-frequency-link topology with single transformer secondary, for use with embodiments of the present invention.
Figure 8:
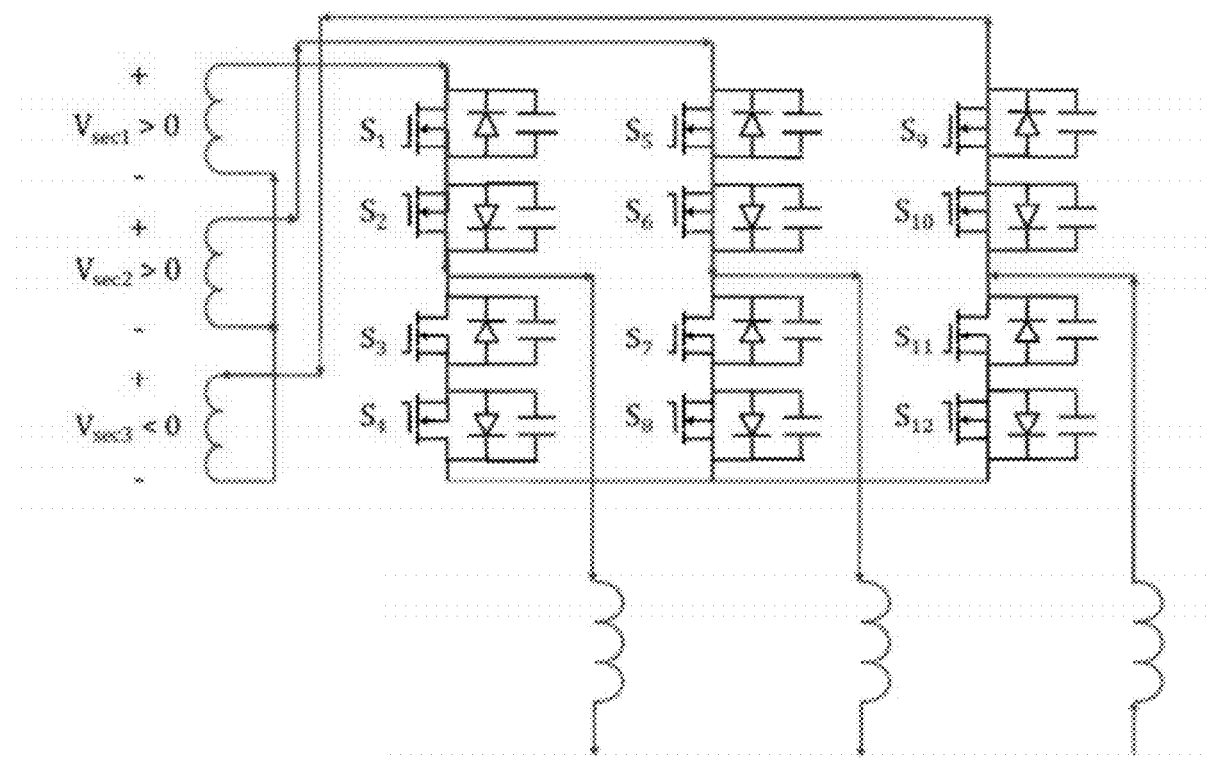
FIG. 8 shows an example three-phase PWM cycloconverter type high-frequency-link topology for use with embodiments of the present invention.

Further, the inventive switching scheme shown in FIG. 3 can be extended for higher numbers of phases. FIGS. 6A and 6B show an example topology 80, including a primary-side dc/ac converter 82, an HF transformer 84, and a secondary side converter embodied in a three-phase PWM cycloconverter 86. The cycloconverter 86 includes three legs, each providing a phase for ac/ac conversion. FIG. 7 shows a three-phase CHFL topology with signal transformer secondary, including three legs 88, 89, 90. Similarly, FIG. 8 shows an example three-phase CHFL topology with star-connected transformers at the secondary.

The present invention is not intended to be limited to the converter shown in FIGS. 1-2, the specific switching scheme shown in FIG. 3, or the specific CHFL topologies shown herein. Many variations are possible under the scope of the invention, as will be appreciated by one of ordinary skill in the art. For example, FIG. 3 shows an example switching scheme for the secondary side converter 58 when the modulation of the primary side dc/ac converter 32 is based on sine-wave modulation. However, the modulation for the primary side dc/ac converter 40 can be based on conventional sine-wave or square-wave modulation. Generally, the converter 30 generates a sine-wave waveform after filter, and thus the bipolar pulsating output of the inverter is sinewave modulated. This can be done either: 1) by a primary-side full-bridge converter performing sinewave modulation and the secondary side ac/ac converter only unfolds, as in FIG. 2, or 2) by a primary-side converter performing square-wave modulation and the secondary-side ac/ac converter modulating this signal to create sinewave modulation output. For sinewave modulation, as in case 1) above, the ac/ac converter 34 may not need to adjust the width of the pulses generated by the dc/ac converter 40, since the pulse already includes the sinusoidally-coded information. For the square-wave modulation case (case 2)), the ac/ac converter 34 should adjust the width of the pulses generated by the dc/ac converter 32, since the pulse does not encode any sinusoidal information. Even if the transformer secondary output is square wave bipolar, the example switching sequence for loss mitigation holds, though timing may be different, as will be appreciated by those of ordinary skill in the art.

Also, the ac input voltage need not be strictly +, 0, − with varying width. If, as another example, the ac input varies between high frequency positive sinusoid, 0, negative sinusoid where the modulation is captured (e.g., by the amplitude variation of the sinusoids), methods according to embodiments of the present invention can be performed. For some very high frequency applications, as a nonlimiting example, smoother sinewave voltages may be applied rather than pulsating voltages.

Further, the modulation of the example ac/ac converter switches is employed so that the output of the ac/ac converter 34 (which preferably is also the output of the overall isolated converter 30 (e.g., inverter)) generates sinusoidally-encoded bipolar pulses that can be filtered to generate the low-frequency ac signals for the load 42. For the full-bridge single-phase system shown in FIGS. 5A-5F and for multi-phase systems, e.g., three-phase systems such as those shown in FIGS. 6A-6B, 7, and 8, the underlying soft-switching modulation, as shown by example in FIG. 3 for a single-phase half-bridge inverter) can remain essentially the same, except for a possible adjustment needed (depending on the particular topology) for adjustment of width of pulses generated by the dc/ac converter 32, and methods for doing so will be appreciated by those of ordinary skill in the art. The dc/ac converter 32 can be single or multi-phase in itself depending typically on single or multi-phase application, and implementation of multi-phase dc/ac converters will be understood by those of ordinary skill in the art.

Figure 9:
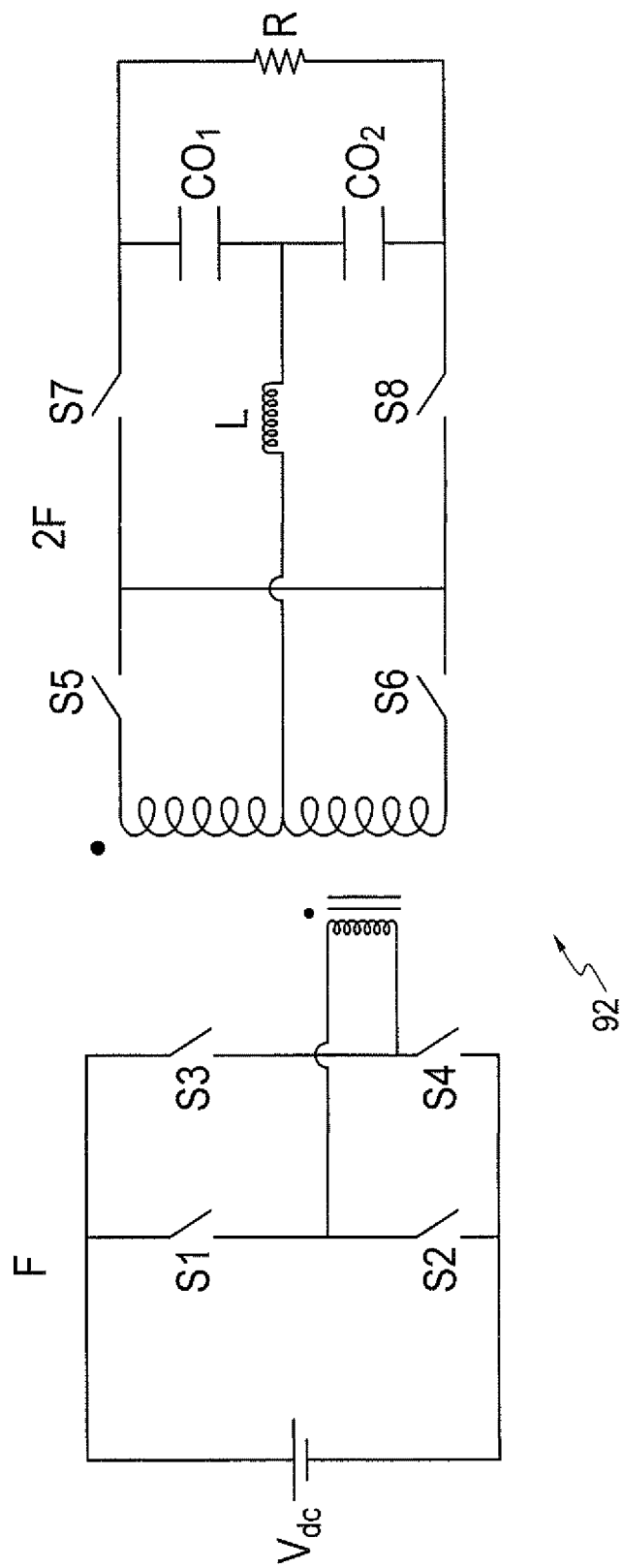
FIG. 9 shows an example rectifier-type HFL (RHFL) for use with an example method of the present invention.

FIG. 9 shows an additional embodiment extending the example switching scheme to a rectifier-type HFL (RHFL) 92 that is an equivalent of the CHFL topology shown in FIG. 2. The switching frequency doubles on the secondary side after the front-end fast-operating switches due to rectification of the bipolar voltage at the output of the secondary. The example RHFL can be operated similarly to the CHFL topology shown in FIG. 2.

Figure 10:
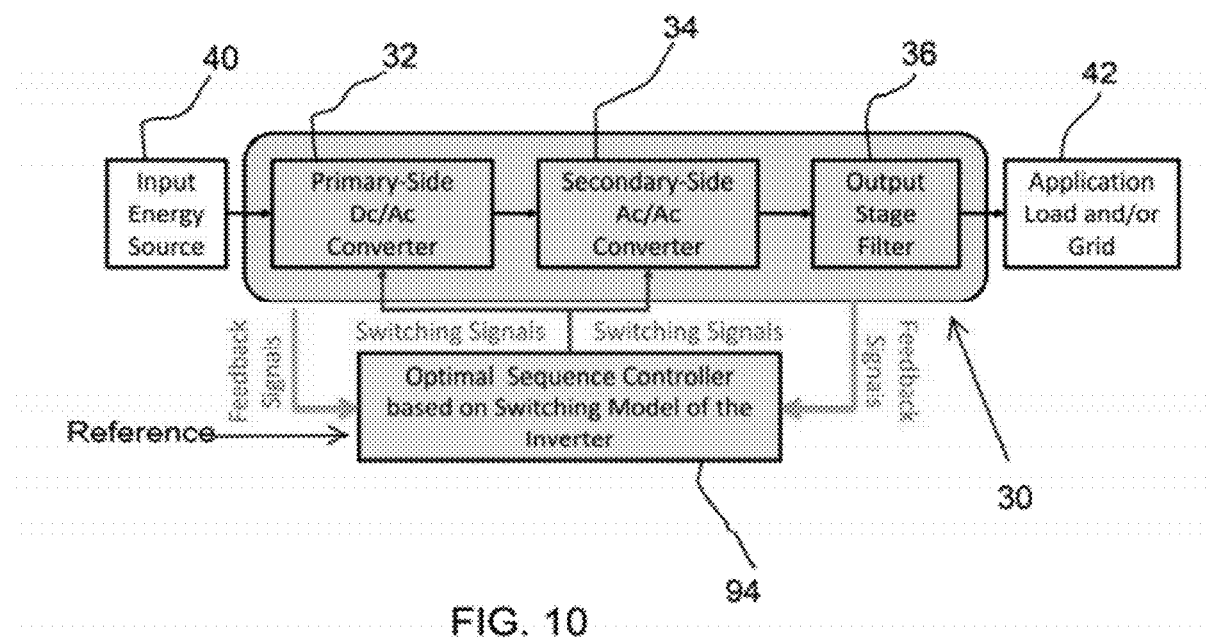
FIG. 10 shows a cycloconverter type high-frequency-link with an alternative control strategy, according to an embodiment of the present invention.

Additionally, though the example CHFL converter shown generally in FIG. 1 includes a control stage 44 having a separate controller 46 and modulator 48, a control stage that integrates the control and modulation into one block, such as control stage 94 shown in FIG. 10, can instead be provided. Conventionally, control and modulation in power electronics are separately designed with modulation mostly open loop. The objective of the example modulation scheme is to translate the continuous control-command output of the controller to switching signals (e.g., using a predetermined approach) so that the switches, which typically only understand binary (i.e., 0 or 1) signals, can be operated. What is controlled by the converter or inverter depends on the application at hand. For instance, the control goal could be to regulate output voltage or grid current injection, or other goals.

As such, the example CHFL shown in FIG. 1 can provide inputs to the control stage 44 including reference signals that, respectively, provide the desired control objective(s) and real-time feedback on a converter system to ascertain the measure of the difference between the desired and actual performances. Output of the controller 46 is thus fed to the modulator block 48 to generate the switching signals for the switches of the converter.

The example approach shown in FIG. 10, more directly generates a switching sequence by integrating the control and modulation into a controller such as controller 94. This example controller 94 can be configured based on an optimal sequence control approach that generates the switching signals for the overall converter 30 based on an optimal criterion (e.g., regulate voltage grid current injection) and a discontinuous model or the converter. The basic control approaches shown in FIG. 10 can be applied to various topographical configurations, as will be appreciated by those of ordinary skill in the art.

In an example method according to the present invention, open-loop-control experiments were performed on the example CHFL converter (inverter) topology shown in FIG. 2 as operated using the control scheme shown in FIGS. 3 and 4A-4L. The results were compared with a conventional scheme for the ac/ac controller, as described in S. Deng, H. Mao, J. Mazumder, I. Batarseh, and K. Islam, "A new control scheme for high frequency link inverter design," in IEEE Applied Power Electronics Conference, pp. 512-517, 2003, and S. K. Mazumder, R. Burra, R. Huang, M. Tahir, K. Acharya, G. Garcia, S. Pro, O. Rodrigues, and E. Duheric, "A high-efficiency universal grid-connected fuel-cell inverter for residential application," IEEE Transactions on Industrial Electronics, vol. 57, no. 10, pp. 3431-3447, 2010, both of which are incorporated herein by reference. The dc/ac converter operates at 20 kHz, which transforms to a 40 kHz PWM frequency at the output of the secondary-side ac/ac converter due to frequency doubling. The rated power of the inverter is 1 kW, while the input voltage is set at 36 V. For the dc/ac converter, OptiMOS power MOSFETs (IPP08CN10N G) from Infineon are used, which have the following specifications: voltage and current ratings—100 V, 95 A, gate charge—100 nC, on-state resistance—8.2 mΩ. For the ac/ac converter, Q-class HiPerFET Power MOSFETs (IXFX21N100Q) from IXYS are used. The specifications of this device include: voltage and current ratings—1000 V and 21 A, gate-to-source and gate-to-drain stored charges—27 and 18 nC, on-state resistance—0.5Ω. A nanocrystalline core (STX 1060M1) is used for the center-tapped HF transformer with number of primary and secondary turns as 12 and 104 (i.e., 2×52), respectively. Values of the output filter inductance ($L_f$) and capacitance ($C_f$) are set to be 2.4 mH and 0.5 μF, respectively.

Figure 11:
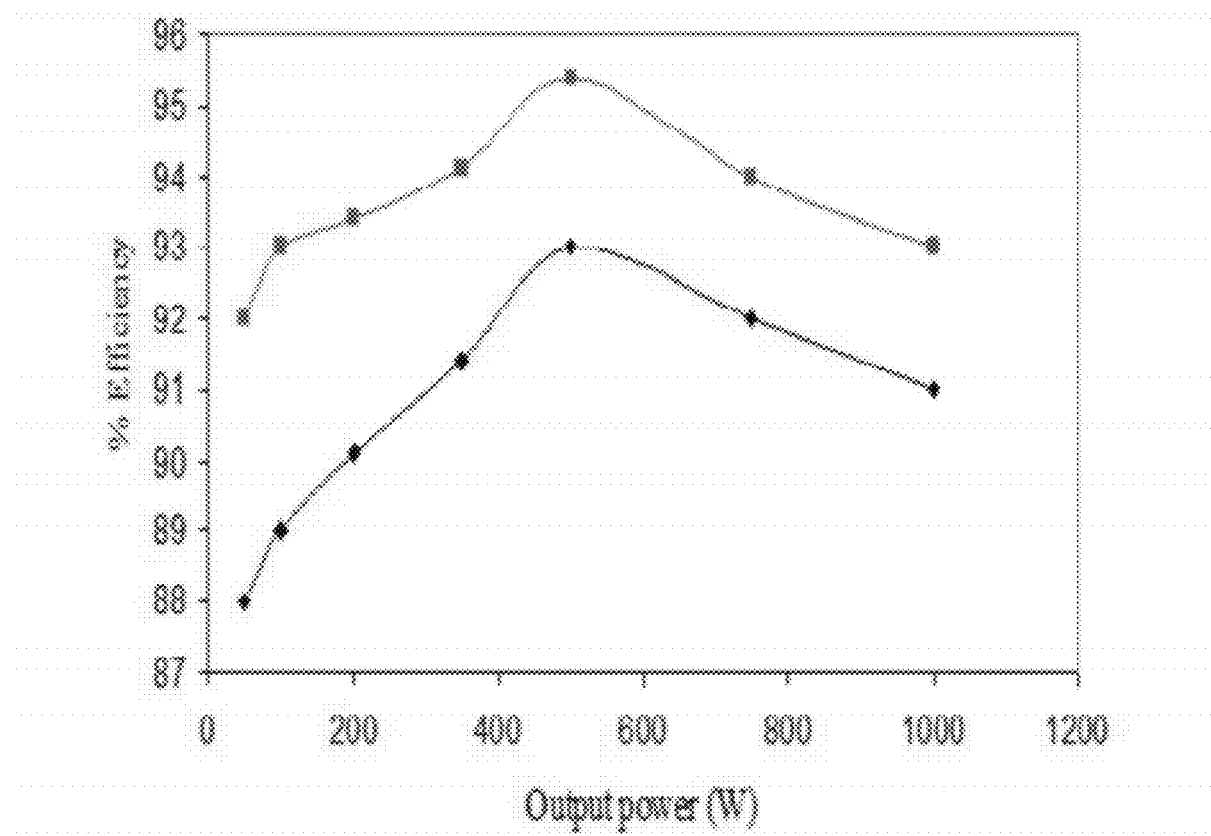
FIG. 11 shows a comparison of efficiencies for ZVS-based (top trace) and conventional schemes (bottom trace) for operating an inverter.
Figure 12A:
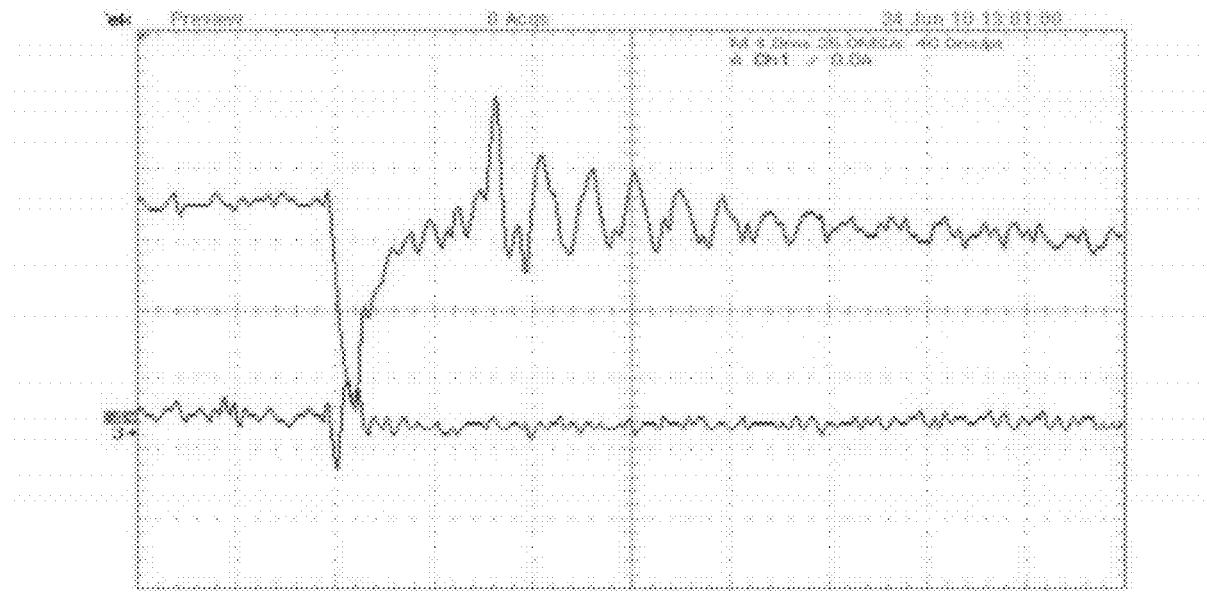
FIGS. 12A-12B show MOSFET drain-to-source voltage (falling trace) and gate-to-source voltage (rising trace) for ZVS-based (FIG. 12A) and conventional (FIG. 12B) schemes.
Figure 12B:
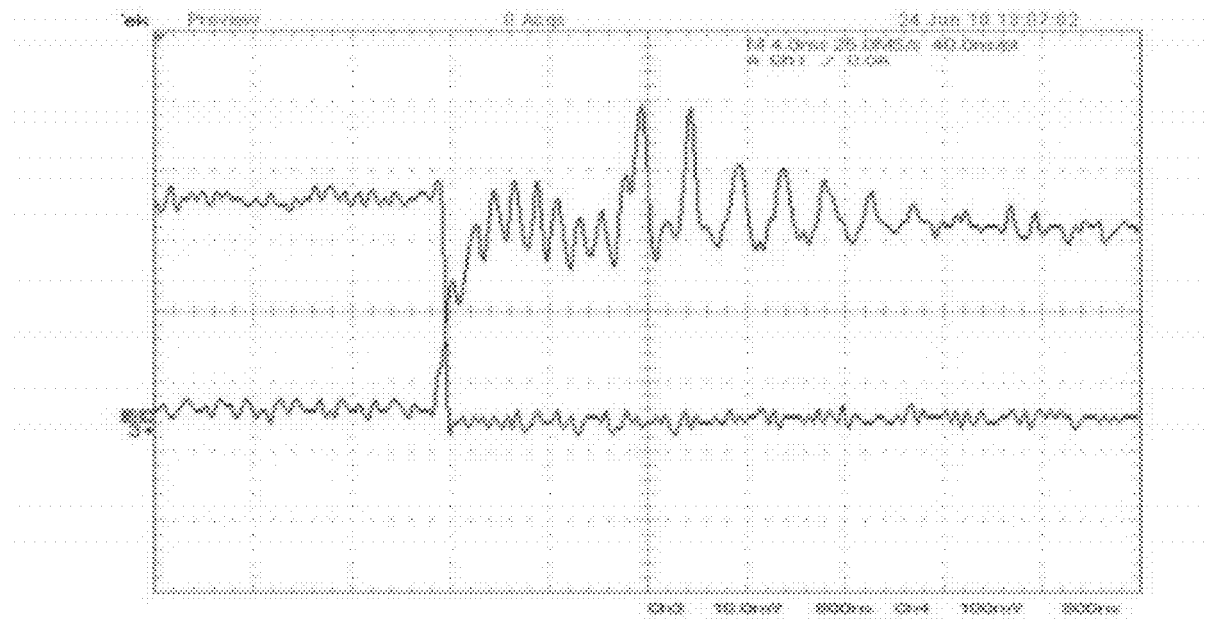
Figure 13:
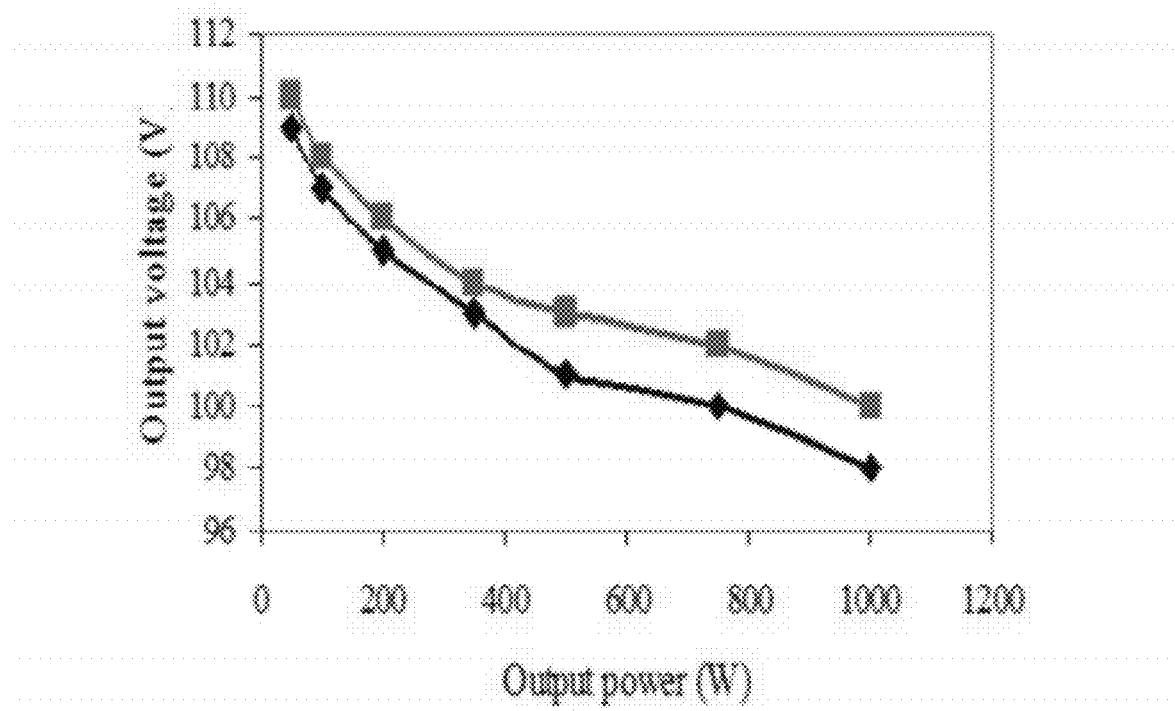
FIG. 13 shows experimental output voltage yield of an open-loop inverter with varying load demand for ZVS-based (top trace) and conventional (bottom trace) schemes.
Figure 14:
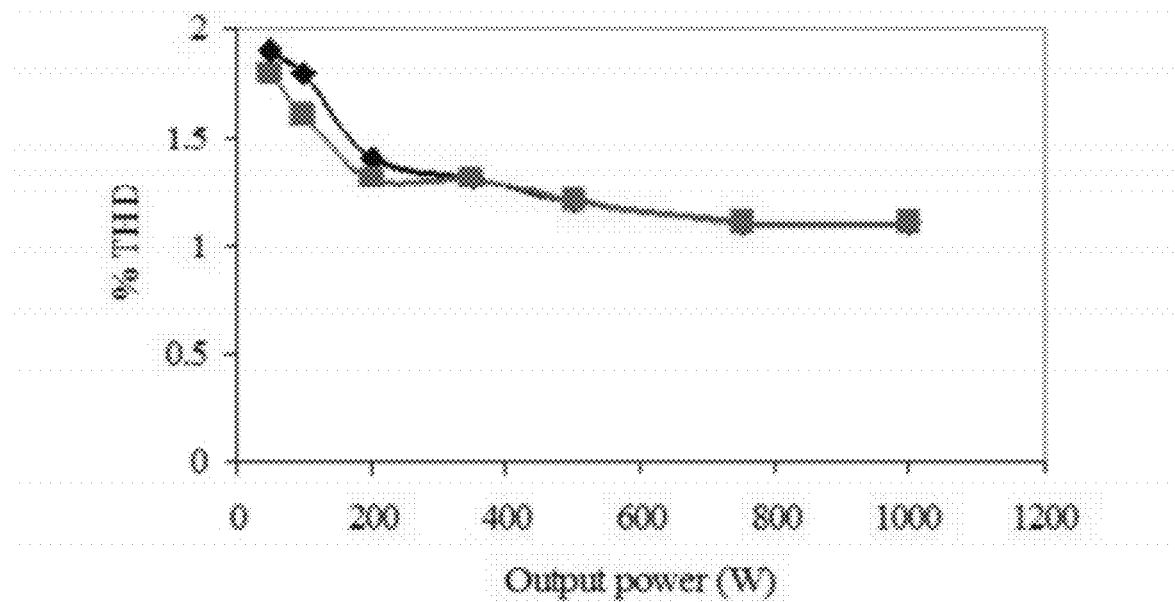
FIG. 14 shows experimental total harmonic distortion (THD) of inverter output voltage for ZVS-based (bottom trace) and conventional (top trace) schemes.

FIG. 11 shows the comparison of the inverter efficiencies obtained using the example. ZVS and the conventional schemes. Inverter efficiency using the example ZVS scheme shows an improvement of over 2% at rated power and over 3% at around 20% of the rated power. FIGS. 12A and 12B show the overlapping gate-to-source and drain-to-source voltages for the conventional and example ZVS schemes, illustrating a softer discharge mechanism for the example ZVS scheme. FIG. 13 shows the impact of the enhanced efficiency using the example ZVS scheme on the output voltage of the inverter. The results of the open-loop inverter show higher output-voltage yield for the example ZVS scheme as compared to the conventional scheme due to enhanced efficiency obtained using the former. FIG. 14 shows a comparison of the total harmonic distortion (THD) of the inverter output voltage using the example ZVS and conventional schemes. The conventional scheme results in a small kink near the zero crossing. Hence, as the output power reduces and the switching effect becomes more dominant, the slight difference shows up as a small difference in the THD. However, at higher power, when the peak current is higher, the difference is negligible.

Embodiments of the present invention provide, among other things, a new zero-voltage-switching (ZVS) scheme for ac/ac converter of a high-frequency-link photovoltaic/fuel-cell inverter. Example schemes can achieve turn-on and turn-off of all ac/ac converter switches under zero-voltage-switching (ZVS) condition. Example ZVS methods decouple the conduction and switching losses of the power MOSFETs and as such, one can potentially choose power MOSFETs with lower on-state resistance at the price of slightly higher output capacitance. Unlike some conventional schemes where a diode and an active device (e.g., MOSFET or IGBT) conduct during the transition and the on states, in example schemes according to the present invention the diode only plays a small role during the transition. As such, the reverse-recovery problem of the diode is mitigated, enabling high-frequency switching with minimal compromise in efficiency. Example methods can provide several advantages over conventional inverter operations including, but not limited to, an ability to operate at higher switching frequency without compromising efficiency and without needing high-speed external antiparallel diodes, lower part count as compared to a two-stage ac/ac converter comprising a diode-rectifier stage followed by an ac/ac or voltage-sourced converter, and/or a single scheme for unity- and non-unity-power-factor loads, and thus sensing the polarities of the output voltage and output current is not a necessity.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. For a high-frequency-link converter having a high-frequency-link transformer coupled to a primary side converter and a secondary side converter, the secondary side converter comprising an ac/ac converter circuit for converting an ac input voltage to an ac output voltage, the ac input voltage varying between zero and a dc voltage, the ac/ac converter circuit including a leg comprising first and second arms, and each arm comprising first and second switches, a method for operating the ac/ac converter circuit, the method comprising, in sequence:
    a) during a time when the ac input voltage is zero, causing the first and second switches for both the first and second arms to be on;
    b) after a) and during a time when the ac input voltage is zero, causing a selected switch of the s second arm to be turned off;
    c) after b), causing the ac/ac converter circuit to receive the ac input voltage during a time when the ac input voltage transitions from zero to a dc level until a time during which the selected switch of the second arm blocks the ac input voltage, whereby a current direction through the second arm is reversed;
    d) after c), causing the ac/ac converter circuit to receive the ac input voltage until a time during which the primary-side converter attains a zero state and the ac input voltage approaches zero voltage, whereby current to the second arm is blocked;
    e) after d), causing the ac/ac converter circuit to receive the ac input voltage from a time during which the ac input voltage approaches zero until a time during which the ac input voltage is zero, whereby current flows through the second arm in the original direction; and
    f) after e), and while the ac input voltage is zero, causing the selected switch of the second arm to be turned on.

2. The method of claim 1, wherein performing steps a)-f) provides a half-switching cycle.

3. The method of claim 1, wherein the dc level is positive.

4. The method of claim 1, further comprising, in sequence:
    g) after f) and during a time when the ac input voltage is zero, causing the first and second switches for both the first and second arms to be on;
    h) after g) and during a time when the ac input voltage is zero, causing a selected switch of the first arm to be turned off;
    i) after h), causing the ac/ac converter circuit to receive the ac input voltage during a time when the ac input voltage transitions to a second dc level until a time during which the selected switch of the first arm blocks the ac input voltage;
    j) after i), causing the ac/ac converter circuit to receive the ac input voltage until a time during which the primary-side converter attains a zero state and the ac input voltage approaches zero voltage;
    k) after j), causing the ac/ac converter circuit to receive the ac input voltage from a time during which the ac input voltage approaches zero voltage until a time during which the ac input voltage is zero; and
    l) after k), and while the ac input voltage is zero, causing the selected switch of the first arm to be turned on.

5. The method of claim 4, further comprising:
    repeating steps a)-l) to provide a full switching sequence.

6. The method of claim 1, wherein performing a) causes output current from the primary side converter to be shared equally between the first and second arms.

7. The method of claim 5, wherein the ac input voltage varies between a positive level, zero, and a negative level;

wherein the ac input varies in a switching cycle between one of tristate (+, 0, −) dc voltage levels or varies in a switching cycle between one of (positive sinusoidal, 0, negative sinusoidal) voltages.

8. The method of claim 1, wherein performing d) causes the first and second switches of the first arm to support the output current from the primary side converter.

9. The method of claim 1, wherein performing e) causes the output capacitance of the selected switch of the second arm to be clamped by an antiparallel diode.

10. The method of claim 1, wherein said causing each of the first, second, third, and fourth switches to be on, said causing the selected switch of the second arm to be turned off, and said causing the selected switch of the second arm to be turned on comprises providing a control signal to gates for each of the first and second switches for both the first and second arms.

11. The method of claim 10, wherein said providing a control signal comprises providing controlling signals based on feedback from the ac/ac converter circuit and reference signals, and modulating the controlling signals to provide switching signals.

12. The method of claim 1, wherein the converter has a cycloconverter-type high-frequency link (CHFL) topology or a rectifier-type high-frequency-link (RHFL) topology.

13. The method of claim 1, wherein the ac input voltage is bipolar and tristate with variable pulse width modulated sinusoidally.

14. The method of claim 1, wherein the ac/ac converter further comprises a plurality of additional legs, each of the plurality of additional legs including first and second arms, and each of the first and second arms including first and second switches, and further comprising:
performing steps a)-f) for each of the plurality of additional legs;
wherein at least one of the plurality of additional legs provides an additional phase for the ac output voltage.

15. A converter comprising:
a primary-side converter;
a high-frequency-link transformer coupled to said primary-side converter;
a secondary-side ac/ac converter circuit coupled to said high-frequency-link transformer for receiving an ac input voltage varying between zero and a dc voltage and providing an ac output voltage, said ac/ac converter circuit comprising a leg including first and second arms, and each arm comprising first and second switches;
an output stage filter coupled to said ac/ac converter circuit for filtering the ac output voltage; and
a control stage for operating said primary-side converter and said secondary-side ac/ac converter circuit, wherein said control stage is configured to:
a) during a time when the ac input voltage is zero, cause the first and second switches for both the first and second arms to be on;
b) after a) and during a time when the ac input voltage is zero, cause a selected switch of the second arm to be turned off;
c) after b), cause the ac/ac converter circuit to receive the ac input voltage during a time when the ac input voltage transitions to a positive/negative dc level until a time during which the selected switch of the second arm blocks the ac input voltage;
d) after c), cause the ac/ac converter circuit to receive the ac input voltage until a time during which the primary-side converter attains a zero state and the ac input voltage approaches zero;
e) after d), cause the ac/ac converter circuit to receive the ac input voltage from a time during which the ac input voltage approaches zero until a time during which the ac input voltage is zero; and
f) after e), and while the ac input voltage is zero, cause the selected switch of the second arm to be turned on.

16. The converter of claim 15, wherein the converter has a cycloconverter-type high-frequency link (CHFL) or a rectifier-type high-frequency-link (RHFL) topology.

17. The converter of claim 15, wherein said control stage comprises:
a controller coupled to said primary-side converter and said secondary-side ac/ac converter for receiving feedback signals and producing control signals; and
a modulator coupled to said controller, said primary-side converter, and said secondary-side ac/ac converter for receiving said produced control signals and generating a switching signal for the first and second switches of the first and second arms.

18. The converter of claim 15, wherein said first and second switches of the first and second arms each comprise:
a transistor.

19. The converter of claim 15, wherein each of said first and second switches of the first and second arms comprises an internal or external diode.

20. The converter of claim 15, wherein said control stage is further configured to:
g) after f) and during a time when the ac input voltage is zero, cause the first and second switches for both the first and second arms to be on;
h) after g) and during a time when the ac input voltage is zero, cause a selected switch of the first arm to be turned off;
i) after h), cause the ac/ac converter circuit to receive the ac input voltage during a time when the ac input voltage transitions to a positive/negative dc level until a time during which the selected switch of the first arm blocks the ac input voltage;
j) after i), cause the ac/ac converter circuit to receive the ac input voltage until a time during which the primary-side converter attains a zero state and the ac input voltage approaches zero voltage;
k) after j), cause the ac/ac converter circuit to receive the ac input voltage from a time during which the ac input voltage approaches zero voltage until a time during which the ac input voltage is zero; and
l) after k), and while the ac input voltage is zero, cause the selected switch of the first arm to be turned on.

21. The converter of claim 15, wherein said secondary side ac/ac converter further comprises a plurality of additional legs to provide a multi-phase converter, wherein each of the additional legs comprises first and second arms, and each arm comprises first and second switches;
wherein said control stage is further configured to cause the converter to perform steps a)-f) for each of the plurality of additional legs;
wherein each of the plurality of additional legs provides an additional phase for the ac output voltage.

22. The converter of claim 15, wherein said ac input voltage comprises tristate bipolar pulse.

23. For a high-frequency-link converter having a high-frequency-link transformer coupled to a primary side converter and a secondary side converter, the secondary side converter comprising an ac/ac converter circuit for converting an ac input voltage to an ac output voltage, the ac input voltage varying between zero and a dc voltage, the ac/ac converter circuit including a leg comprising first and second arms, and each arm comprising at least one switch, a method for operating the ac/ac converter circuit, the method comprising, in sequence:
  a) during a time when the ac input voltage is zero, causing each of the at least one switch for both the first and second arms to be on, wherein current flows through the first arm along a first direction and through the second arm along a second, opposite direction;
  b) after a) and during a time when the ac input voltage is zero, causing a selected switch of the a second arm to be turned off;
  c) keeping the at least one switch for the first arm turned on and the selected switch for the second arm turned off as the ac input voltage transitions to a dc level, reaches the dc level, approaches zero, and again reaches zero;
  d) after c), and while the ac input voltage is zero, causing the selected switch for the second arm to be turned on;
  wherein between c) and d) and when the ac input voltage transitions to the dc level, a current direction through the second arm is reversed, wherein when the ac input voltage reaches the dc level, the ac input voltage is blocked from the second arm by the selected switch;
  wherein between c) and d) and when the ac input voltage approaches zero until a time when the ac input voltage again reaches zero current flows through the second arm in the original direction.

* * * * *